United States Patent
Aoyama

(10) Patent No.: US 10,794,776 B2
(45) Date of Patent: Oct. 6, 2020

(54) FAILURE DETERMINATION CIRCUIT, PHYSICAL QUANTITY MEASUREMENT DEVICE, ELECTRONIC APPARATUS, AND VEHICLE

(71) Applicant: Seiko Epson Corporation, Tokyo (JP)

(72) Inventor: Takashi Aoyama, Chino (JP)

(73) Assignee: Seiko Epson Corporation (JP)

( * ) Notice: Subject to any disclaimer, the term of this patent is extended or adjusted under 35 U.S.C. 154(b) by 295 days.

(21) Appl. No.: 15/926,043

(22) Filed: Mar. 20, 2018

(65) Prior Publication Data

US 2019/0170594 A1  Jun. 6, 2019

(30) Foreign Application Priority Data

Mar. 28, 2017  (JP) .................... 2017-062394

(51) Int. Cl.
| | |
|---|---|
| *G01K 15/00* | (2006.01) |
| *G01K 1/00* | (2006.01) |
| *G01K 13/00* | (2006.01) |
| *G01K 7/00* | (2006.01) |
| *G01K 19/00* | (2006.01) |
| *G01C 19/5607* | (2012.01) |
| *G07C 5/08* | (2006.01) |
| *G01P 1/00* | (2006.01) |

(52) U.S. Cl.
CPC ......... *G01K 19/00* (2013.01); *G01C 19/5607* (2013.01); *G01K 15/007* (2013.01); *G01K 2205/00* (2013.01); *G01P 1/006* (2013.01); *G07C 5/0808* (2013.01)

(58) Field of Classification Search
USPC ..................... 374/1, 170, 141, 208
See application file for complete search history.

(56) References Cited

U.S. PATENT DOCUMENTS

| | | | |
|---|---|---|---|
| 2007/0126471 A1 | 6/2007 | Jeong | |
| 2012/0055230 A1 | 3/2012 | Naruse et al. | |

FOREIGN PATENT DOCUMENTS

| | | |
|---|---|---|
| JP | 2634112 B2 | 7/1997 |
| JP | 2000-340623 A | 12/2000 |
| JP | 4981396 B2 | 7/2012 |
| JP | 2014-197010 A | 10/2014 |

*Primary Examiner* — Mirellys Jagan
(74) *Attorney, Agent, or Firm* — Harness, Dickey & Pierce, P.L.C.

(57) ABSTRACT

A failure determination circuit includes a switching circuit that receives a signal including an output voltage from a temperature sensor and a first reference voltage and outputs the signal in a time division manner, an A/D conversion circuit that A/D converts an output of the switching circuit, and a first determination circuit, and the first determination circuit determines a failure of the temperature sensor based on a signal based on a first digital signal obtained by A/D converting an output voltage from the temperature sensor by the A/D conversion circuit, a signal based on a second digital signal obtained by A/D converting the first reference voltage by the A/D conversion circuit, and temperature characteristics data based on a change in characteristics of the temperature sensor due to temperature and a change in characteristics of the first reference voltage due to temperature.

20 Claims, 14 Drawing Sheets

FAILURE DETERMINATION CIRCUIT, PHYSICAL QUANTITY MEASUREMENT DEVICE, ELECTRONIC APPARATUS, AND VEHICLE

BACKGROUND

1. Technical Field

The present invention relates to a failure determination circuit, a physical quantity measurement device, an electronic apparatus, and a vehicle.

2. Related Art

Currently, various electronic apparatuses and systems in which angular velocity measurement device (physical quantity measurement device) is installed and which perform predetermined control based on a measured angular velocity are widely used. For example, in a travelling control system of an automobile, processing for preventing side slipping of the automobile or detecting rollover is performed based on the measured angular velocity.

For example, in JP-A-2014-197010, such angular velocity measurement device (physical quantity measurement device) includes a temperature sensor, and the angular velocity measurement device which compensates for temperature fluctuation of a signal output from the angular velocity measurement device using a measured angular velocity and an output of the temperature sensor, an electronic apparatus, a vehicle, and the like equipped with the angular velocity measurement device have been proposed.

In the meantime, when the temperature sensor used to compensate for temperature fluctuation of an output signal fails, a signal different from an output signal to be originally output is output. For that reason, a technique for detecting a failure of a temperature sensor by being further provided with a temperature sensor or the like is used, in addition to the temperature sensor which is used to compensate for temperature fluctuation of the output signal. However, when a plurality of temperature sensors are provided, a circuit scale increases.

SUMMARY

An advantage of some aspects of the invention is to provide a failure determination circuit capable of reducing a circuit scale of the failure determination circuit and determining a failure of a temperature sensor. Another advantage of some aspects of the invention is to provide a physical quantity measurement device, an electronic apparatus, and a vehicle that include the failure determination circuit capable of reducing the circuit scale of the failure determination circuit and determining the failure of the temperature sensor.

The invention can be implemented as the following forms or application examples.

Application Example 1

A failure determination circuit according to this application example includes a switching circuit that receives a signal including an output voltage from a temperature sensor and a first reference voltage and outputs the signal in a time division manner, an A/D conversion circuit that A/D converts an output of the switching circuit, and a first determination circuit, and the first determination circuit determines a failure of the temperature sensor based on a signal based on a first digital signal obtained by A/D converting an output voltage from the temperature sensor by the A/D conversion circuit, a signal based on a second digital signal obtained by A/D converting the first reference voltage by the A/D conversion circuit, and temperature characteristics data based on a change in characteristics of the temperature sensor due to temperature and a change in characteristics of the first reference voltage due to temperature.

In the failure determination circuit according to this application example, the failure determination circuit is configured to include the switching circuit, the A/D conversion circuit, and the first determination circuit. The switching circuit receives a plurality of signals including the output signal of the temperature sensor and the first reference voltage having characteristics (temperature characteristics) that change with temperature, and outputs these signals in a time division manner. The A/D conversion circuit converts a signal which includes the output signal of the temperature sensor output from the switching circuit and the first reference voltage having temperature characteristics into a digital signal. Then, the first determination circuit determines a failure of the temperature sensor based on a signal based on the first digital signal obtained by converting the output voltage of the temperature sensor, a signal based on the second digital signal obtained by converting the first reference voltage, and temperature characteristics data calculated from the output voltage of the temperature sensor and the first reference voltage. That is, it is possible to determine the failure of the temperature sensor based on the change in characteristics of the first reference voltage having temperature characteristics due to temperature and the change in characteristics of the output voltage of the temperature sensor due to temperature. For that reason, there is no need to be provided with a plurality of temperature sensors and it is possible to reduce an increase in the circuit scale of the failure determination circuit. Accordingly, it is possible to realize the failure determination circuit which can reduce the increase in the circuit scale of the failure determination circuit and determine the failure of the temperature sensor.

Application Example 2

In the failure determination circuit according to the application example, the switching circuit may further receive a second reference voltage, and the change in characteristics of the first reference voltage due to temperature and the change in characteristics of the second reference voltage due to temperature may be different from each other.

In the failure determination circuit according to this application example, it is possible to determine the failure of the temperature sensor by using both of the temperature characteristics data based on the change in characteristics of the first reference voltage and the temperature sensor due to temperature and the temperature characteristics data based on the change in characteristics of the second reference voltage and the temperature sensor due to temperature. That is, a failure of the temperature sensor can be determined based on a plurality of reference voltages having a change due to temperature. Accordingly, it is possible to improve accuracy of the failure determination of the temperature sensor.

Application Example 3

In the failure determination circuit according to the application example, the switching circuit may further receive a third reference voltage, and the change in characteristics of the third reference voltage due to temperature may be smaller than the change in characteristics of the first reference voltage due to temperature.

The change in the characteristics of the third reference voltage due to temperature may be small.

In the failure determination circuit according to this application example, a digital signal based on the third reference voltage having a small change in characteristics due to temperature is input to the failure determination circuit. The change in characteristics of the third reference voltage due to temperature is smaller than the change in characteristics of the first reference voltage due to temperature. That is, a change due to temperature of a digital value obtained by converting the third reference voltage by the A/D conversion circuit is also small. For that reason, it is possible to determine the failure of the A/D conversion circuit, in the first determination circuit, by determining whether the digital signal based on the third reference voltage is a predetermined value or not. With this, reliability of the first digital signal and the second digital signal, which are converted into digital signals by the A/D conversion circuit, is further improved. For that reason, reliability of the failure of the temperature sensor determined using the signal based on the first digital signal and the signal based on the second digital signal is also improved. Accordingly, it is possible to realize the failure determination circuit which can reduce the increase in the circuit scale of the failure determination circuit and can determine the failure of the temperature sensor with high reliability.

Application Example 4

The failure determination circuit according to the application example may further include a memory, and the temperature characteristics data may be stored in the memory and the temperature characteristics data stored in the memory may be changeable.

In the failure determination circuit according to this application example, the temperature characteristics data used for the failure determination by the first determination circuit is stored in a rewritable memory. The temperature characteristics data may be rewritten and thus, the failure determination circuit may also deal with a temperature sensor having different characteristics in a versatile manner. Furthermore, in the failure determination circuit according to this application example, the temperature characteristics data based on the change in characteristics of the temperature sensor due to temperature and the change in characteristics of the first reference voltage due to temperature may be stored in the memory in, for example, a manufacturing line, so as to make it possible to cancel variation in the failure determination circuit and to increase determination accuracy of the failure determination circuit. Accordingly, it is possible to realize the failure determination circuit which can reduce the increase in the circuit scale of the failure determination circuit and determine the failure of the temperature sensor with high accuracy.

Application Example 5

The failure determination circuit according to the application example may further include a second determination circuit, and the first reference voltage may be generated based on a first power supply voltage and the second determination circuit may receive the first power supply voltage and a second power supply voltage different from the first power supply voltage and compare the first power supply voltage with the second power supply voltage to determine abnormality of the first power supply voltage.

In the failure determination circuit according to this application example, the first reference voltage is generated from the first power supply voltage. Then, the second determination circuit may determine a failure of the first power supply voltage by comparing the first power supply voltage with the second power supply voltage which is different from the first power supply voltage. That is, reliability of the first reference voltage based on the first power supply voltage is improved. Accordingly, it is possible to realize the failure determination circuit which can reduce the increase in the circuit scale of the failure determination circuit and determine the failure of the temperature sensor with high reliability.

Application Example 6

A physical quantity measurement device according to this application example includes the failure determination circuit according to any one of the application examples described above.

In the physical quantity measurement device according to this application example, the failure determination circuit capable of performing the failure determination of the temperature sensor without increasing the circuit scale is provided and thus, it is possible to realize a highly reliable physical quantity measurement device without becoming large.

Application Example 7

The physical quantity measurement device according to the application example may include a physical quantity measurement element and an output correction circuit, and a signal based on a physical quantity measurement signal measured by the physical quantity measurement element may further be input to the switching circuit, and the output correction circuit may correct a signal based on a third digital signal obtained by A/D converting the signal, which is based on the physical quantity measurement signal measured by the physical quantity measurement element, by the A/D conversion circuit with a signal based on the first digital signal obtained by A/D converting the output voltage of the temperature sensor by the A/D conversion circuit and output the corrected signal.

In the physical quantity measurement device according to this application example, the output physical quantity measurement signal is corrected based on a signal output from the temperature sensor capable of determining the presence or absence of a failure. That is, the signal output from the physical quantity measurement device is a signal corrected with the output of the temperature sensor performing a normal operation. Accordingly, it is possible to realize the physical quantity measurement device having high reliability of the output signal.

Application Example 8

An electronic apparatus according to this application example includes the physical quantity measurement device according to the application examples described above.

Application Example 9

A vehicle according to this application example includes the physical quantity measurement device according to the application examples described above.

According to this application examples, the physical quantity measurement device provided with the failure determination circuit, which can determine the failure of the temperature sensor without increasing the circuit scale, is provided and thus, it is possible to realize a highly reliable electronic apparatus and vehicle without increasing the scale of failure determination circuit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the invention will be described in detail with reference to the drawings. The embodiments to be described below do not unreasonably limit the contents of the invention described in the appended claims. In addition, not all of the configurations described below are necessarily essential components of the invention.

In the following, explanation will be made on a physical quantity processing device (angular velocity processing device) as an example, as equipment using a failure determination circuit in the embodiment.

1. Physical Quantity Measurement Device 1.1 First Embodiment

Configuration of Physical Quantity Measurement Device

Figure 1:
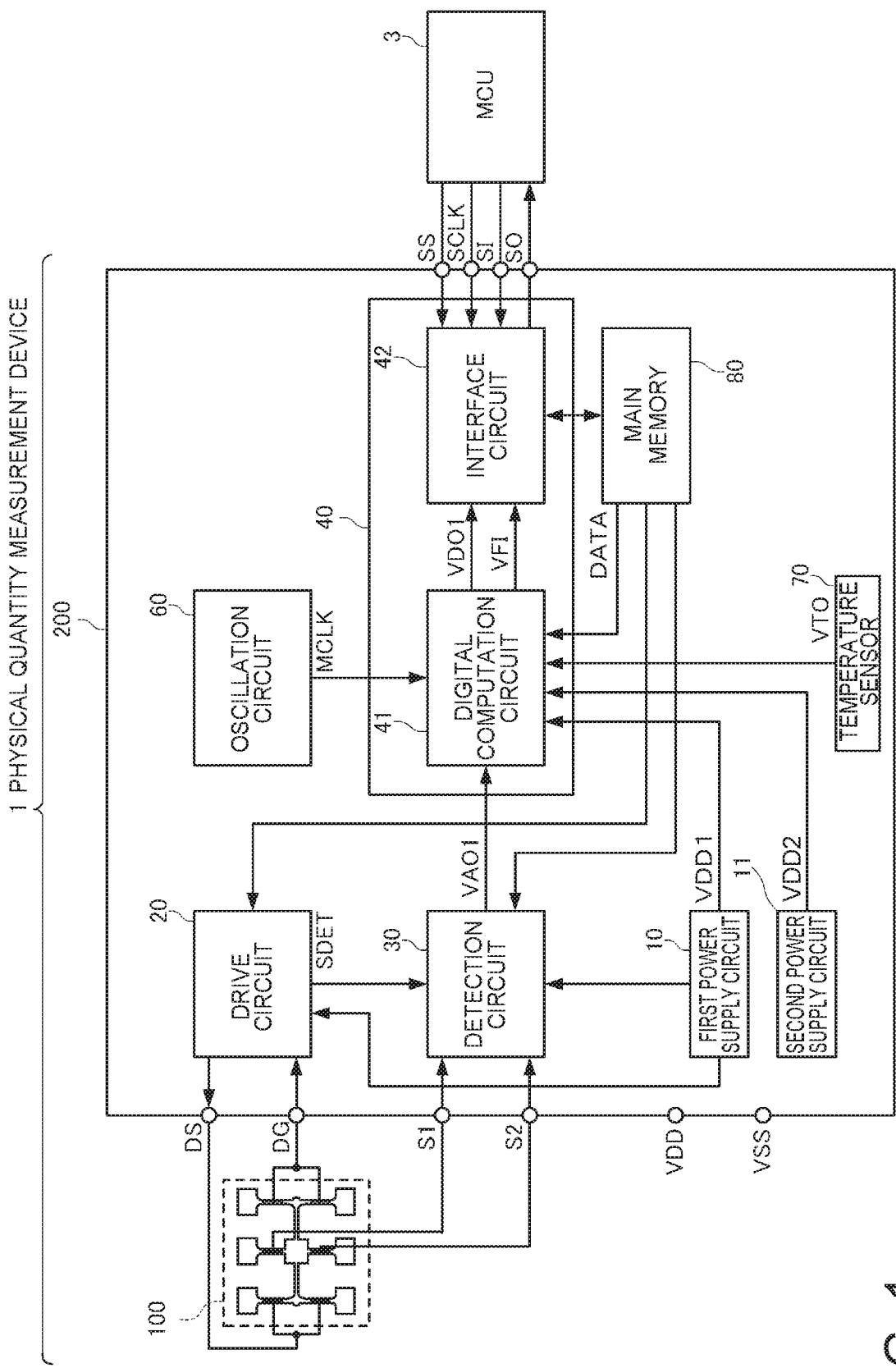
FIG. 1 is a diagram illustrating a configuration example in a first embodiment of a physical quantity measurement device.

FIG. 1 is a diagram illustrating a configuration example in a first embodiment of a physical quantity measurement device (angular velocity processing device) 1. In the first embodiment, the physical quantity measurement device 1 is configured to include a physical quantity measurement element 100 and a physical quantity measurement circuit 200. Furthermore, the physical quantity measurement device 1 may be configured to include a micro control unit (MCU) 3 which performs various computation processing and control using data output from the physical quantity measurement device 1.

The physical quantity measurement element 100 (example of a "physical quantity measurement element") includes a vibrator element in which a drive electrode and a detection electrode are disposed. Generally, the vibrator element is sealed in a package whose airtightness is secured in order to increase oscillation efficiency by making impedance of the vibrator element as small as possible. In the first embodiment of the physical quantity measurement device 1, the physical quantity measurement element 100 includes a so-called double T-shaped vibrator element having two drive vibration arms of which a planar shape is a T shape.

Figure 2:
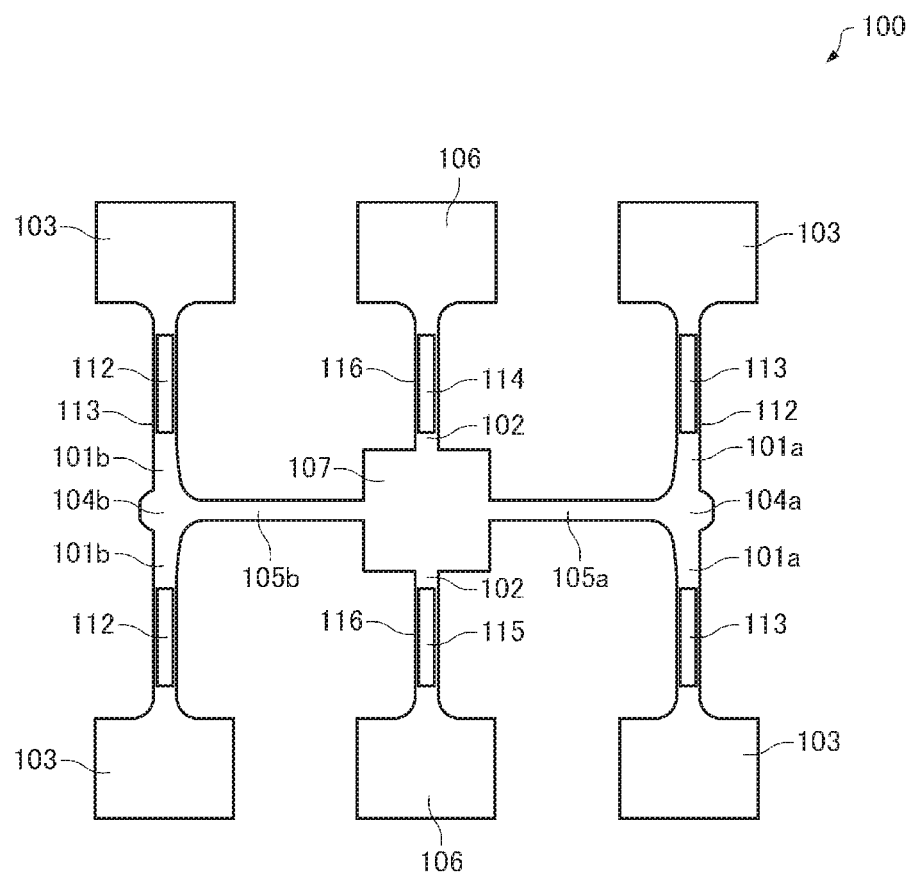
FIG. 2 is a plan view of a vibrator element of a physical quantity measurement element in the first embodiment of the physical quantity measurement device.
Figure 2:
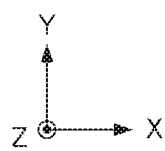

FIG. 2 is a plan view of a vibrator element of the physical quantity measurement element 100 in the first embodiment of the physical quantity measurement device 1. The physical quantity measurement element 100 includes, for example, a double T-shaped vibrator element formed of a Z cut quartz crystal substrate. In the vibrator element made of quartz crystal as a material, variation of a resonance frequency with respect to temperature change is extremely small and thus, there is an advantage that detection accuracy of angular velocity can be enhanced. The X-axis, the Y-axis, and the Z-axis in FIG. 2 indicate axes of quartz crystal.

As illustrated in FIG. 2, in the vibrator element of the physical quantity measurement element 100, drive vibration arms 101a and 101b extend from two driving base portions 104a and 104b in the +Y-axis direction and the −Y-axis direction, respectively. Drive electrodes 112 and 113 are formed on the side surface and the upper surface of the drive vibration arm 101a, respectively, and drive electrodes 113 and 112 are formed on the side surface and the upper surface of the drive vibration arm 101b, respectively. The drive electrodes 112 and 113 are connected to a drive circuit 20 through a DS terminal and a DG terminal of the physical quantity measurement circuit 200 illustrated in FIG. 1, respectively.

Driving base portions 104a and 104b are connected to a rectangular detecting base portion 107 through connection arms 105a and 105b extending in the −X-axis direction and the +X-axis direction, respectively.

A detection vibration arm 102 extends from the detecting base portion 107 in the +Y-axis direction and the −Y-axis direction. A detection electrode 114 or 115 is formed on the upper surface of the detection vibration arm 102 and a common electrode 116 is formed on the side surface of the detection vibration arm 102. The detection electrodes 114 and 115 are connected to a detection circuit 30 through an S1 terminal and an S2 terminal of the physical quantity measurement circuit 200 illustrated in FIG. 1, respectively. Further, the common electrode 116 is grounded.

Figure 3:
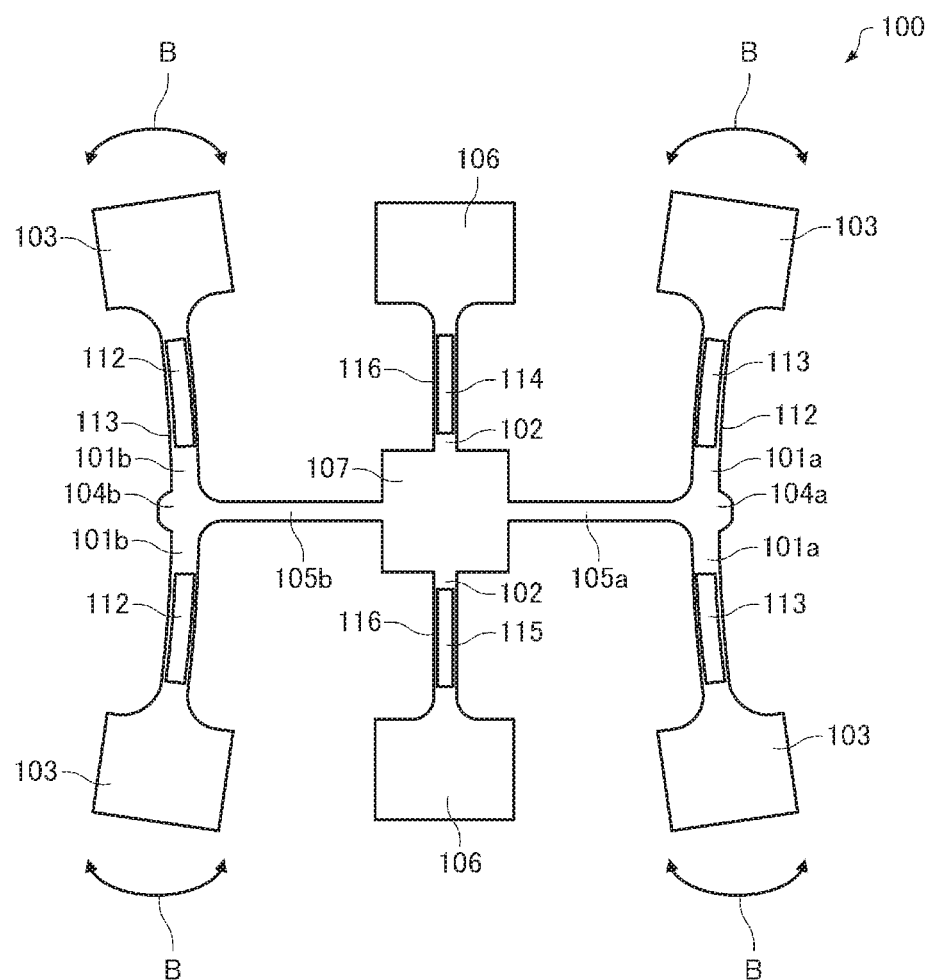
FIG. 3 is a diagram for explaining an operation of the physical quantity measurement element in the first embodiment of the physical quantity measurement device.

When an AC voltage is applied as a drive signal between the drive electrode 112 and the drive electrode 113 of the drive vibration arms 101a and 101b, as illustrated in FIG. 3, the drive vibration arms 101a and 101b perform flexural vibration (excitation vibration) in which tip end portions of the two drive vibration arms 101a and 101b repeat approaching and separating from each other by inverse piezoelectric effect, as illustrated by an arrow B.

Figure 4:
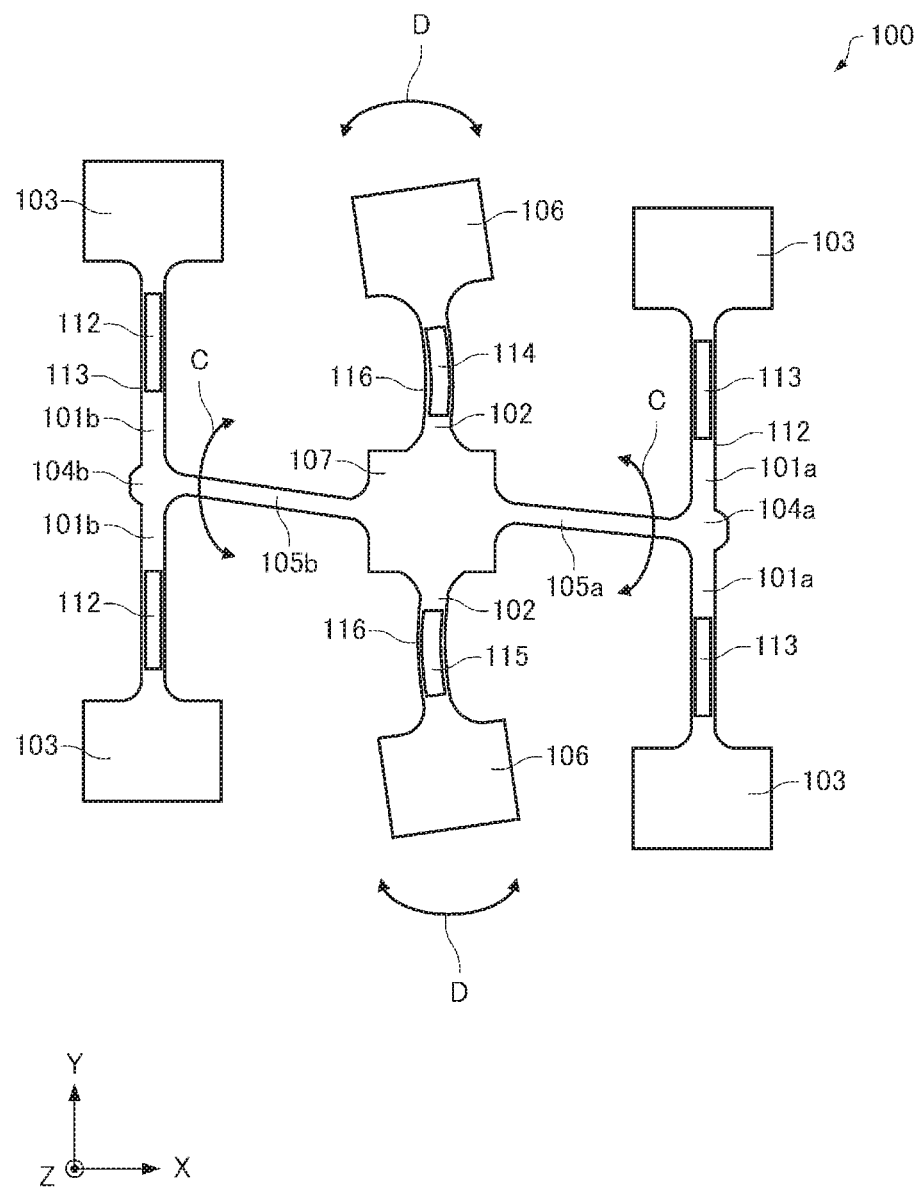
FIG. 4 is a diagram for explaining another operation of the physical quantity measurement element in the first embodiment of the physical quantity measurement device.

In this state, when angular velocity with the Z-axis as a rotation axis is applied to the vibrator element of the physical quantity measurement element 100, the Coriolis force in the direction orthogonal to both of the direction of the flexural vibration of the arrow B and the Z-axis acts on the drive vibration arms 101a and 101b. As a result, as illustrated in FIG. 4, connection arms 105a and 105b vibrate as indicated by an arrow C. Then, the detection vibration arm 102 performs flexural vibration as indicated by an arrow D in association with vibration (arrow C) of the connection arms 105a and 105b. The flexural vibration of the detection vibration arm 102 accompanying the Coriolis force and the flexural vibration (excitation vibration) of the drive vibration arms 101a and 101b are out of phase by 90 degrees.

By the way, if magnitude of vibration energy or an amplitude of vibration when the drive vibration arms 101a and 101b perform flexural vibration (excitation vibration) are equal between the two drive vibration arms 101a and 101b, vibration energy of the driving vibration arms 101a and 101b is balanced, and in a state where no angular velocity is applied to the physical quantity measurement element 100, the detection vibration arm 102 does not perform flexural vibration. However, when balance of vibration energy of the two drive vibration arms 101a and 101b is lost, flexural vibration occurs in the detection vibration arm 102 even in a state where the angular velocity is not applied to the physical quantity measurement element 100. This flexural vibration is called leakage vibration, which is flexural vibration of the arrow D similar to vibration based on the Coriolis force, but the flexural vibration is in phase with the drive signal.

Then, due to the piezoelectric effect, AC charges based on the flexural vibrations are generated at the detection electrodes 114 and 115 of the detection vibration arm 102. Here, the AC charges generated based on the Coriolis force varies according to magnitude of the Coriolis force (in other words, magnitude of the angular velocity applied to the physical quantity measurement element 100). On the other hand, the AC charges generated based on leakage vibration is constant regardless of the magnitude of the angular velocity applied to the physical quantity measurement element 100.

A rectangular weight portion 103 having a wider width than the drive vibration arms 101a and 101b is formed at the tips of the drive vibration arms 101a and 101b. The weight portion 103 is formed at the tip of the drive vibration arms 101a and 101b so as to make it possible to increase the Coriolis force and obtain a desired resonance frequency with a comparatively short vibration arm. Similarly, a weight portion 106 having a wider width than the detection vibration arm 102 is formed at the tip of the detection vibration arm 102. The weight portion 106 is formed at the tip of the detection vibration arm 102 so as to make it possible to increase the AC charges to be generated in the detection electrodes 114 and 115.

As such above, the physical quantity measurement element 100 outputs the AC charges (angular velocity component) based on the Coriolis force and the AC charges (vibration leakage component) based on the leakage vibration of the excitation vibration through the detection electrodes 114 and 115 with the Z axis as the detection axis.

Returning to FIG. 1, the physical quantity measurement circuit 200 in the first embodiment of the physical quantity measurement device 1 is configured to include a first power supply circuit 10, a second power supply circuit 11, a drive circuit 20, a detection circuit 30, a physical quantity processing circuit 40, an oscillation circuit 60, a temperature sensor 70, and a main memory 80, and may be, for example, a single chip integrated circuit (IC). The physical quantity measurement circuit 200 may have a configuration in which some of the components are omitted or changed, or other components are added.

The first power supply circuit 10 generates a constant voltage or a constant current such as a reference voltage (analog ground voltage) from a voltage supplied from a VDD terminal of the physical quantity measurement circuit 200, and supplies the constant voltage and the constant current to the drive circuit 20, the detection circuit 30, a digital computation circuit 41 included in the physical quantity processing circuit 40, and the like. Here, the voltage input to the physical quantity processing circuit 40 is particularly set as a power supply voltage VDD1 (example of a "first power supply voltage").

A second power supply circuit 11 generates and outputs the power supply voltage VDD2 to be input to the physical quantity processing circuit 40 from the voltage supplied from the VDD terminal of the physical quantity measurement circuit 200. The second power supply circuit 11 may generate a power supply voltage VDD2 (example of the "second power supply voltage") input to the physical quantity processing circuit 40, for example, based on a voltage input from a terminal (not illustrated) of the physical quantity measurement circuit 200.

The drive circuit 20 generates a drive signal for causing the physical quantity measurement element 100 to excite and oscillate and supplies the drive signal to the drive electrode 112 of the physical quantity measurement element 100 through the DS terminal. The drive circuit 20 receives an oscillation current generated in the drive electrode 113 by the excitation oscillation of the physical quantity measurement element 100 through the DG terminal and performs feedback-control on the amplitude level of the drive signal such that an amplitude of the oscillation current is held constant. The drive circuit 20 generates a detection signal SDET having the same phase as the drive signal and outputs the detection signal SDET to the detection circuit 30.

The detection circuit 30 receives AC charges (detection current) (example of a "physical quantity measurement signal") generated at the two detection electrodes 114 and 115 of the physical quantity measurement element 100 through the S1 terminal and the S2 terminal, detects the angular velocity component contained in the AC charges (detection current) by using the detection signal SDET, and generates an angular velocity signal VAO1 (example of "signal based on the physical quantity measurement signal") which is a signal of a voltage level in accordance with the magnitude of the angular velocity component and outputs the angular velocity signal VAO1.

The main memory 80 includes a nonvolatile memory (not illustrated), and various kinds of trimming data (adjustment data, correction data, temperature characteristics data) and the like for the drive circuit 20, the detection circuit 30, and the physical quantity processing circuit 40 are stored in the nonvolatile memory. The nonvolatile memory can be configured as, for example, a metal oxide nitride oxide silicon (MONOS) type memory or an electrically erasable programmable read-only memory (EEPROM). Furthermore, the main memory 80 may be configured in such a way that registers (not illustrated) are included, and when power of the physical quantity measurement circuit 200 is turned on (when a voltage of the VDD terminal rises from 0 V to a desired voltage), various kinds of trimming data and processing data, and the like stored in the nonvolatile memory are transferred to the registers to be held and various trimming data, processing data, and the like held in the registers are supplied to the drive circuit 20 and the detection circuit 30. Here, data transferred from the main memory 80 to the physical quantity processing circuit 40 is set as characteristic data DATA. Temperature characteristic data may be a change rate (%/° C.) of a characteristic value (output value) with respect to temperature, each coefficient value of a polynomial using temperature as a variable, a correction value table for each temperature range, and the like.

The temperature sensor 70 outputs a temperature signal VTO (example of "output voltage of temperature sensor") of a voltage level in accordance with temperature around the temperature sensor 70, may have a positive characteristic that the higher the temperature, the higher the output voltage or a negative characteristic that the higher the temperature, the lower the output voltage. The temperature sensor 70 may be, for example, a circuit that outputs a proportional to absolute temperature (PTAT) voltage.

The physical quantity processing circuit 40 includes the digital computation circuit 41 and an interface circuit 42.

The digital computation circuit 41 operates in accordance with a master clock signal MCLK, converts a voltage level of the angular velocity signal VAO1 output from the detection circuit 30 into a digital value, performs predetermined computation processing to generate angular velocity data VDO1, and outputs the angular velocity data VDO1 to the interface circuit 42. The digital computation circuit 41 also determines a failure of the temperature sensor 70 and the like. The digital computation circuit 41 generates a failure determination information VFI when a failure of the temperature sensor 70 or the like is detected or in response to a request from the outside (for example, MCU 3), and outputs the failure determination information VFI to the interface circuit 42.

The interface circuit 42 receives various commands transmitted from the MCU 3 and performs processing of transmitting data in accordance with the command to the MCU 3. The interface circuit 42 performs processing of reading data stored in the main memory 80 (nonvolatile memory or registers) in response to a request from the MCU 3 and outputting the read data to the MCU 3, and processing of writing the data input from the MCU 3 to the main memory 80 (nonvolatile memory or register), and the like. The interface circuit 42 is, for example, an interface circuit compatible with a serial peripheral interface (SPI) bus, and receives a selection signal, a clock signal, and a data signal transmitted from the MCU 3 through an SS terminal, SCLK terminal, and SI terminal of the physical quantity measurement circuit 200, respectively, and outputs a data signal to the MCU 3 through the SO terminal of the physical quantity measurement circuit 200. The interface circuit 42 may be an interface circuit compatible with various buses other than the SPI bus (for example, an inter integrated circuit (I2C) bus).

An oscillation circuit 60 functions as a clock generation circuit that generates a master clock signal MCLK and outputs the master clock signal MCLK to the digital computation circuit 41 included in the physical quantity processing circuit 40. The oscillation circuit 60 is configured as, for example, a ring oscillator or a CR oscillation circuit.

Configuration of Drive Circuit

Figure 5:
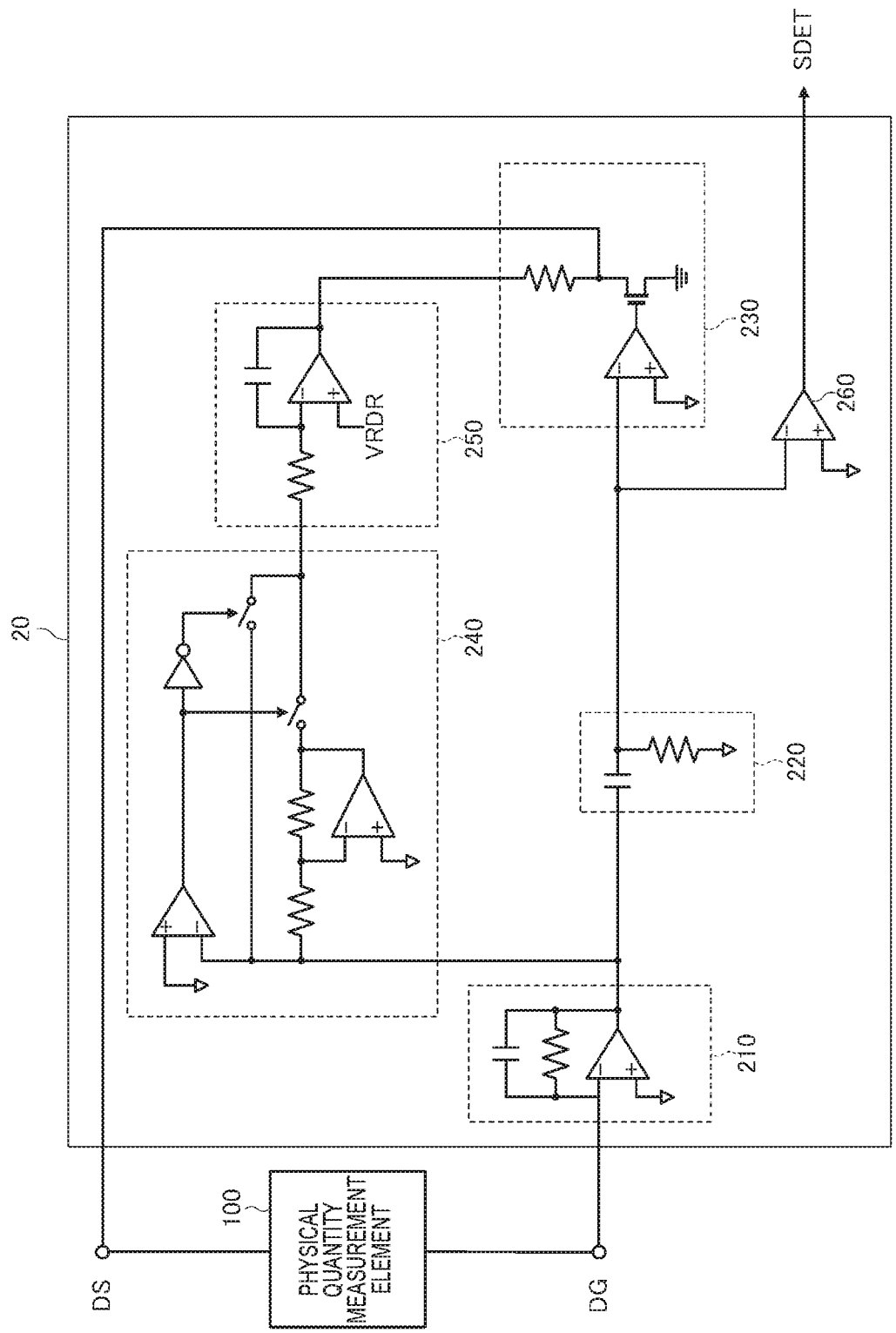
FIG. 5 is a diagram illustrating a configuration of a drive circuit in the first embodiment of the physical quantity measurement device.

Next, the drive circuit 20 will be described. FIG. 5 is a diagram illustrating a configuration example of the drive circuit 20. As illustrated in FIG. 5, the drive circuit 20 in the first embodiment of the physical quantity measurement device 1 includes an I/V conversion circuit 210, a high-pass filter (HPF) 220, a comparator 230, a full-wave rectification circuit 240, an integrator 250, and a comparator 260. The drive circuit 20 may have a configuration in which some of the components are omitted or changed, or other components are added.

The I/V conversion circuit 210 converts the oscillation current, which is generated by excitation oscillation of the physical quantity measurement element 100 and input through the DG terminal, into an AC voltage signal.

The high-pass filter 220 removes an offset of the output signal of the I/V conversion circuit 210.

The comparator 230 compares the voltage of the output signal of the high-pass filter 220 with the reference voltage to generate a binary signal, causes the NMOS transistor to be conductive and outputs a low level when the binary signal is at a high level, and causes the NMOS transistor to be nonconductive and outputs an output voltage of the integrator 250 pulled up through a resistor as a high level when the binary signal is at a low level. The output signal of the comparator 230 is supplied to the physical quantity measurement element 100 as a drive signal through the DS terminal. By matching a frequency (driving frequency) of the drive signal with a resonance frequency of the physical quantity measurement element 100, the physical quantity measurement element 100 can be stably oscillated.

The full-wave rectification circuit 240 rectifies (full-wave rectifies) the output signal of the I/V conversion circuit 210 and outputs a DC converted signal.

The integrator 250 integrates the output voltage of the full-wave rectification circuit 240 based on a desired voltage VRDR generated based on the voltage supplied from the first power supply circuit 10, and outputs the integrated voltage. The output voltage of the integrator 250 decreases as the output of the full-wave rectification circuit 240 increases (as amplitude of the output signal of the I/V conversion circuit 210 becomes larger). Accordingly, the high level voltage of the output signal (drive signal) of the comparator 230 increases as the oscillation amplitude becomes larger and the high level voltage of the output signal (drive signal) of the comparator 230 increases as the oscillation amplitude becomes smaller and thus, automatic gain control (AGC) is applied so that the oscillation amplitude is held constant.

The comparator 260 amplifies the voltage of the output signal of the high-pass filter 220 to generate a binary signal (square wave voltage signal) and outputs the binary signal as a detection signal SDET.

Configuration of Detection Circuit

Figure 6:
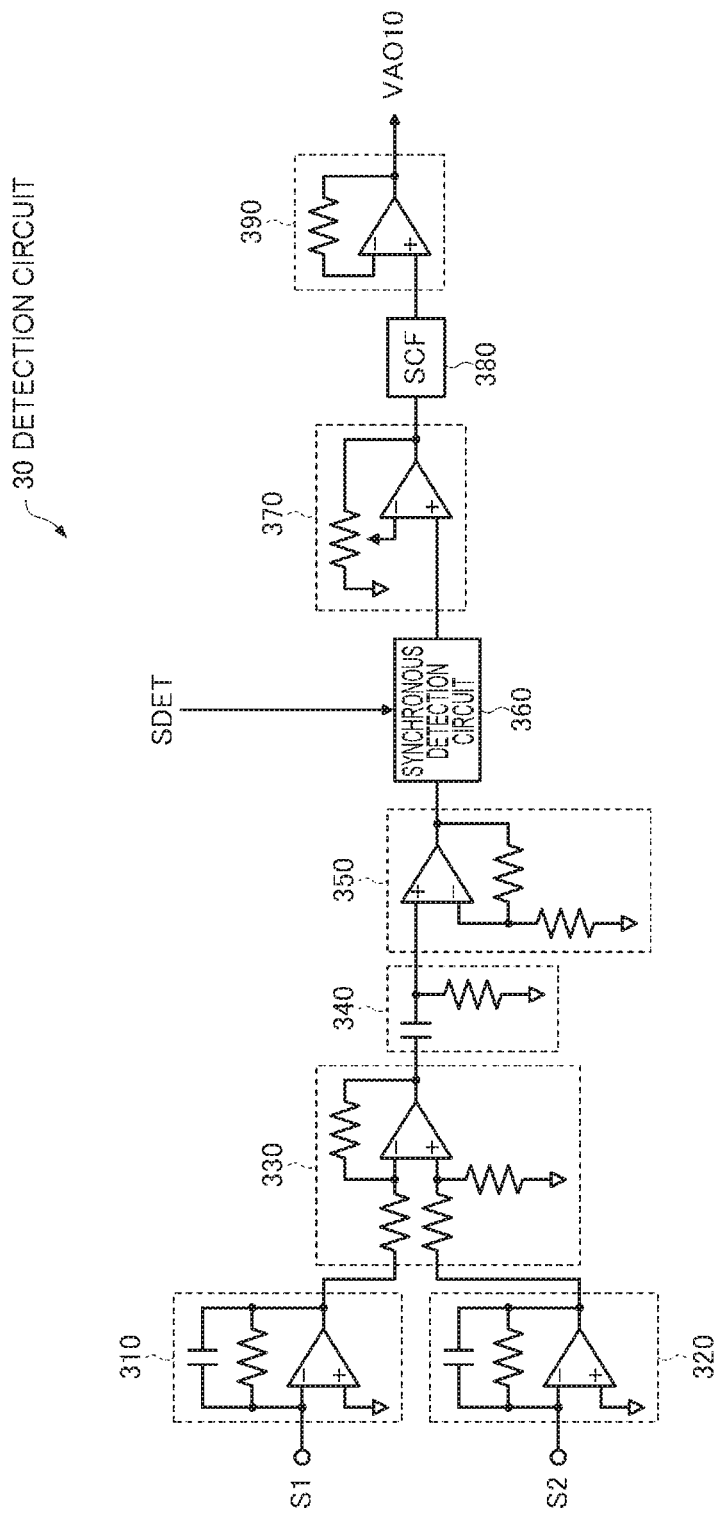
FIG. 6 is a diagram illustrating a configuration of a detection circuit in the first embodiment of the physical quantity measurement device.

Next, the detection circuit 30 will be described. FIG. 6 is a diagram illustrating a configuration example of the detection circuit 30. As illustrated in FIG. 6, the detection circuit 30 in the first embodiment of the physical quantity measurement device 1 includes charge amplifiers 310 and 320, a differential amplifier 330, a high-pass filter (HPF) 340, an AC amplifier 350, a synchronous detection circuit 360, a variable gain amplifier 370, a switched capacitor filter (SCF) 380, and an output buffer 390. The detection circuit 30 in the first embodiment of the physical quantity measurement device 1 may have a configuration in which some of the components are omitted or changed, or other components are added.

The AC charges (detection current) including angular velocity component and a vibration leakage component is input to the charge amplifier 310 from the detection electrode 114 of the vibrator element of the physical quantity measurement element 100 through the S1 terminal. Similarly, the AC charges (detection current) including the angular velocity component and the vibration leakage component is input to the charge amplifier 320 from the detection electrode 115 of the vibrator element of the physical quantity measurement element 100 through the S2 terminal.

The charge amplifiers 310 and 320 convert the AC charges (detection current) respectively input thereto into an AC voltage signal. The AC charges (detection current) input to the charge amplifier 310 and the AC charges (detection current) input to the charge amplifier 320 are out of phase with each other by 180 degrees, and the phase of the output signal of the charge amplifier 310 and the phase of the output signal of the charge amplifier 320 are in anti-phase each other (deviated by 180 degrees).

The differential amplifier 330 differentially amplifies the output signal of charge amplifier 310 and the output signal of charge amplifier 320. The in-phase component is canceled and the anti-phase component is added and amplified by the differential amplifier 330.

The high-pass filter 340 removes a direct current component contained in an output signal of the differential amplifier 330.

The AC amplifier 350 amplifies an output signal of the high-pass filter 340 and outputs the output signal to the synchronous detection circuit 360.

The synchronous detection circuit 360 receives the output signal of the AC amplifier 350. The synchronous detection circuit 360 synchronously detects the angular velocity component contained in the output signal (detected signal) of the AC amplifier 350 using the detection signal SDET input from the drive circuit 20. For example, the synchronous detection circuit 360 can be configured as a circuit which selects the output signal of the AC amplifier 350 as it is when the detection signal SDET is at the high level and selects a signal obtained by inverting the output signal of the AC amplifier 350 with respect to the reference voltage when the detection signal SDET is at the low level.

The output signal of the AC amplifier 350 includes angular velocity component and a vibration leakage component, but this angular velocity component is in phase with the detection signal SDET whereas the vibration leakage component is in anti-phase with the detection signal SDET. For that reason, the angular velocity component is synchronously detected by the synchronous detection circuit 360, but the vibration leakage component is not detected.

The output signal of the synchronous detection circuit 360 is input to the variable gain amplifier 370. The variable gain amplifier 370 amplifies or attenuates the output signal output from the synchronous detection circuit 360 and outputs a signal having a desired voltage level. The output signal of the variable gain amplifier 370 is input to the switched capacitor filter 380.

The output signal of the variable gain amplifier 370 is input to the switched capacitor filter 380. The switched capacitor filter 380 functions as a low-pass filter that removes a high-frequency component included in the output signal of the variable gain amplifier 370 and allows a signal within a frequency range determined by the specification to pass through. The frequency characteristics of the switched capacitor filter 380 (low-pass filter) is determined by a frequency of a clock signal (not illustrated) obtained by stable oscillation of the physical quantity measurement element 100 and a capacitance ratio of a capacitor (not illustrated) and thus, as compared with an RC low-pass filter, there is an advantage that variation in frequency characteristics is extremely small.

The output signal of the switched capacitor filter 380 is buffered by the output buffer 390 and is amplified or attenuated to a signal having a desired voltage level as needed.

An output signal of the output buffer 390 is input to the physical quantity processing circuit 40 as the angular velocity signal VAO1.

Configuration of Physical Quantity Processing Circuit

Figure 7:
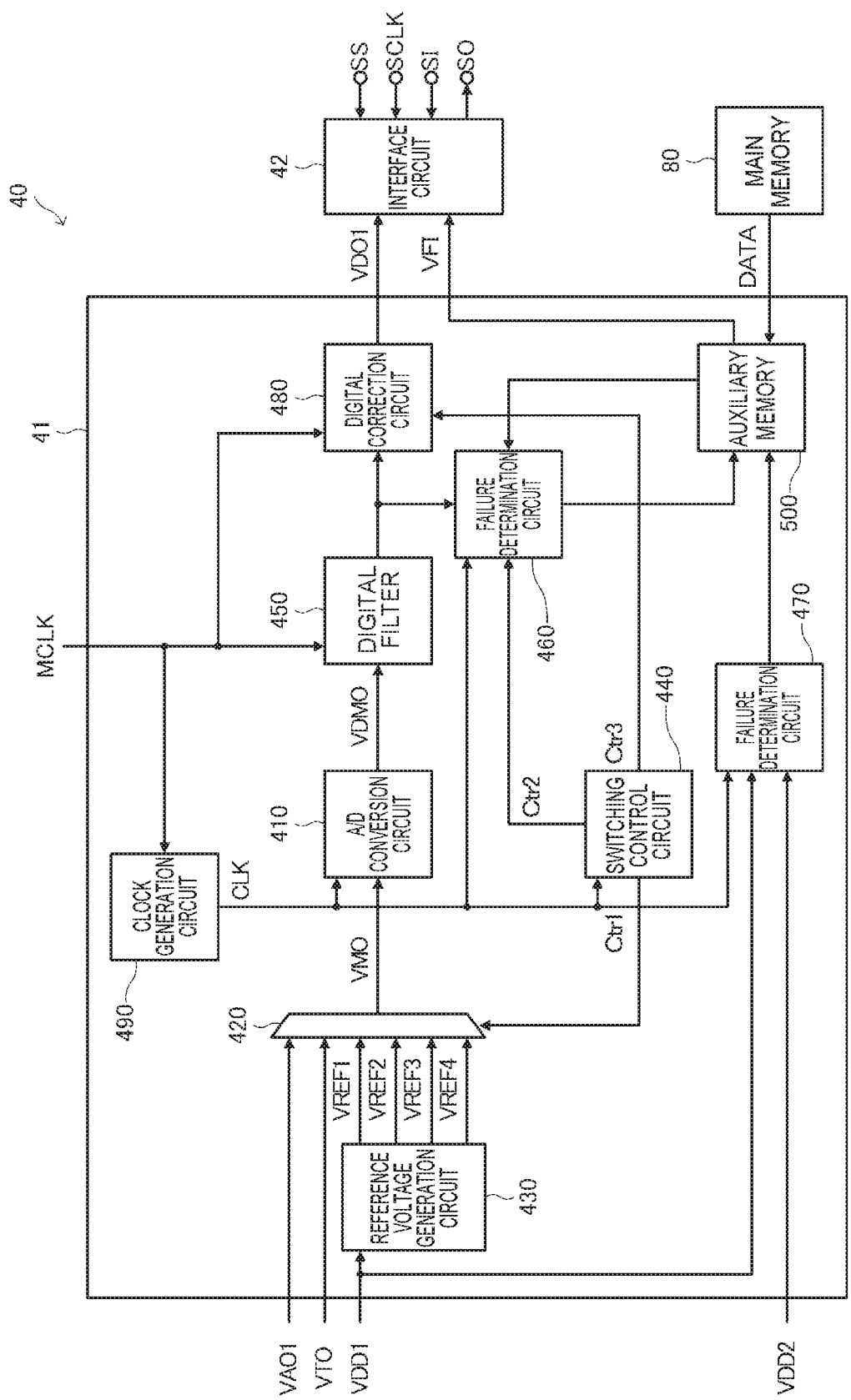
FIG. 7 is a diagram illustrating a configuration of a physical quantity processing circuit in the first embodiment of the physical quantity measurement device.

Next, details of the physical quantity processing circuit 40 will be described. FIG. 7 is a diagram illustrating a configuration example of the physical quantity processing circuit 40. The physical quantity processing circuit 40 is configured to include the digital computation circuit 41 and the interface circuit 42.

As illustrated in FIG. 7, the digital computation circuit 41 includes an A/D conversion circuit 410, a multiplexer 420, a reference voltage generation circuit 430, a switching control circuit 440, a digital filter 450, a failure determination circuit 460, a failure determination circuit 470, a digital correction circuit 480, a clock generation circuit 490, and an auxiliary memory 500. The digital computation circuit 41 may have a configuration in which some of the components are omitted or changed, or other components are added.

Figure 8:
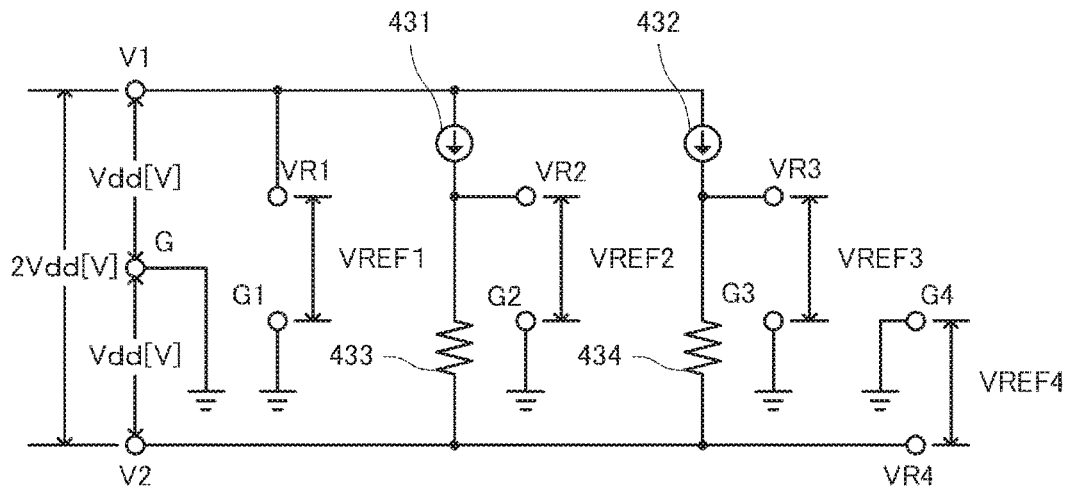
FIG. 8 is a diagram illustrating a circuit configuration of an example of a reference voltage generation circuit in the first embodiment of the physical quantity measurement device.

The reference voltage generation circuit 430 generates four reference voltages VREF1, VREF2, VREF3, and VREF4 based on the power supply voltage VDD1 input from the first power supply circuit 10. FIG. 8 illustrates an example of a circuit configuration of the reference voltage generation circuit 430.

As illustrated in FIG. 8, the reference voltage generation circuit 430 is configured with two constant current elements 431 and 432 and two resistance elements 433 and 434. All of a G1 terminal, a G2 terminal, a G3 terminal, and a G4 terminal illustrated in FIG. 8 are connected to a G terminal.

A voltage generated based on the power supply voltage VDD1 is input to the reference voltage generation circuit 430. In detail, a double voltage Vdd (2Vdd [V]) is supplied between a V1 terminal and a V2 terminal, and the G terminal, which is at the midpoint potential between the V1 terminal and the V2 terminal, is connected to the ground. That is, the V1 terminal is at the potential of Vdd [V] with respect to the G terminal and the V2 terminal is at the potential of −Vdd [V] with respect to the G terminal.

The reference voltage VREF1 (example of "third reference voltage") is the potential with respect to the G1 terminal of a VR1 terminal. The VR1 terminal is connected to the V1 terminal and the G1 terminal is connected to the G terminal. Accordingly, the reference voltage VREF1 becomes Vdd [V] which is a potential of the V1 terminal with respect to the G terminal and is constant with respect to temperature change.

The reference voltage VREF2 (example of "first reference voltage") is the potential of a VR2 terminal with respect to the G2 terminal. The VR2 terminal is commonly connected to the other end of the constant current element 431 and one end of the resistance element 433.

One end of the resistance element 433 is connected to the other end of the constant current element 431 and the VR2 terminal, and the other end thereof is connected to the V2 terminal. The resistance element 433 has, for example, the positive characteristics in which a resistance value increases with respect to temperature.

One end of the constant current element 431 is connected to the V1 terminal and the other end thereof is connected to one end of the resistance element 433. The constant current element 431 is an element that outputs a constant low current without being influenced by temperature, and is configured by, for example, a constant current diode.

A constant current output from the constant current element 431 is supplied to the resistance element 433. That is, a voltage based on the current output from the constant current element 431 and a resistance value of the resistance element 433 is generated at both ends of the resistance element 433. Accordingly, when the temperature is low (that is, resistance value of the resistance element 433 is small), a potential difference between both ends of the resistance element 433 approaches 0 [V] and when the temperature is high (that is, resistance value of the resistance element 433 is large), the potential difference between both ends of the resistance element 433 approaches 2Vdd [V]. That is, the potential of the VR2 terminal, which is the potential of the reference voltage VREF2, with respect to the G2 terminal changes with temperature. In detail, the reference voltage VREF2 approaches −Vdd [V] when the temperature is low and approaches +Vdd [V] when the temperature is high. That is, the potential (voltage level) which is output as the reference voltage VREF2 changes with temperature. It is preferable that the resistance value of the resistance element 434 change uniformly (approximately proportionally) with respect to temperature.

The reference voltage VREF3 (example of "second reference voltage") is the potential of a VR3 terminal with respect to the G3 terminal. The VR3 terminal is commonly connected to the other end of the constant current element 432 and one end of the resistance element 434.

One end of the resistance element 434 is connected to the other end of the constant current element 432 and the VR3 terminal, and the other end thereof is connected to the V2 terminal. The resistance element 434 has, for example, the negative characteristics in which a resistance value decreases with respect to temperature.

One end of the constant current element 432 is connected to the V1 terminal and the other end thereof is connected to one end of the resistance element 434. The constant current element 432 is an element that outputs a constant low current without being influenced by temperature, and is configured by, for example, a constant current diode.

A constant current output from the constant current element 432 is supplied to the resistance element 434. That is, a voltage based on the current output from the constant current element 432 and a resistance value of the resistance element 434 is generated at both ends of the resistance element 434. Accordingly, when the temperature is low (that is, resistance value of the resistance element 434 is large), a potential difference between both ends of the resistance element 434 approaches 2Vdd [V] and when the temperature is high (that is, resistance value of the resistance element 434 is small), the potential difference between both ends of the resistance element 434 approaches 0 [V]. That is, the potential of the VR3 terminal, which is the potential of the reference voltage VREF3, with respect to the G3 terminal changes with temperature. In detail, the reference voltage VREF3 approaches −Vdd [V] when the temperature is low and approaches +Vdd [V] when the temperature is high. That is, the potential (voltage level) which is output as the reference voltage VREF3 changes with temperature. It is preferable that the resistance value of the resistance element 434 change uniformly (approximately proportionally) with respect to temperature.

The reference voltage VREF4 is the potential with respect to the G4 terminal of a VR4 terminal. The VR4 terminal is connected to the V2 terminal and the G4 terminal is connected to the G terminal. Accordingly, the reference voltage VREF4 becomes −Vdd [V], which is a potential of the V2 terminal with respect to the G terminal and is constant with respect to temperature change.

From the matters described above, the four reference voltages VREF1, VREF2, VREF3, and VREF4 in the first embodiment of the physical quantity measurement device 1 are generated based on the VDD1 generated by the first power supply circuit 10. The reference voltage VREF1 and the reference voltage VREF4 are reference voltages that the change in characteristics due to temperature is suppressed as much as possible and the reference voltage VREF2 and the reference voltage VREF3 are reference voltages that positively utilize the change in characteristics due to temperature. That is, the change in characteristics of the reference voltage VREF1 due to temperature is smaller than the change in characteristics due to temperature of the reference voltage VREF2.

The reference voltage VREF2 is a reference voltage at which the voltage value rises as temperature rises and the reference voltage VREF3 is a reference voltage at which the voltage value decreases as temperature rises. That is, it is different from the change in characteristics of the reference voltage VREF2 and the reference voltage VREF3 due to temperature.

The configuration of the reference voltage generation circuit 430 is not limited thereto. For example, as long as the temperature characteristics of the resistance element 433 and the resistance element 434 have either the positive characteristics or the negative characteristics, each of the resistance elements 433 and 434 may have either the characteristics.

The doubled voltage Vdd between the V1 terminal and the V2 terminal which is generated based on the power supply voltage VDD1 may also be, for example, a voltage that is DC-DC converted based on the power supply voltage VDD1 and may be a voltage obtained by connect two Vdds generated by an insulated power supply in series.

Returning to FIG. 7, the multiplexer 420 (example of "switching circuit") receives the angular velocity signal VAO1 input from the detection circuit 30, a temperature signal VTO input from the temperature sensor 70, the reference voltage VREF1, the reference voltage VREF2, the reference voltage VREF3, the reference voltage VREF4, and a control signal Ctrl, and outputs an MUX output signal VMO. That is, the multiplexer 420 receives a plurality of signals including the angular velocity signal VAO1, the reference voltages VREF1, VREF2, VREF3, and VREF 4, and the temperature signal VTO measured by the temperature sensor 70, and outputs the multiplexed signal as a MUX output signal VMO in a time division manner in accordance with the control signal Ctrl. In other words, the MUX output signal VMO is one signal including the angular velocity signal VAO1, the temperature signal VTO, the reference voltages VREF1, VREF2, VREF3, and VREF4. The signal input to the multiplexer 420 is not limited to the signals and various signals, for example, such as acceleration, pressure, and humidity may be input.

The clock generation circuit 490 generates and outputs a clock signal CLK used for sampling by the A/D conversion circuit 410, based on the master clock signal MCLK (output signal of the oscillation circuit 60). The clock signal CLK is also input to the failure determination circuits 460 and 470 and the switching control circuit 440 in common.

The switching control circuit 440 outputs control signals Ctr1, Ctr2, and Ctr3 to the multiplexer 420, the failure determination circuit 460, and the digital correction circuit 480, respectively.

The control signal Ctr1 selects the signal output from the multiplexer 420. For example, the control signal Ctr1 is a 3-bit signal, and when the control signal Ctr1 is "100", the multiplexer 420 selects the angular velocity signal VAO1 and outputs the angular velocity signal VAO1 as the MUX output signal VMO. Also, when the control signal Ctr1 is "111", the multiplexer 420 selects the temperature signal VTO and outputs the temperature signal VTO as the MUX output signal VMO. Also, when the control signal Ctr1 is "000", the multiplexer 420 selects the reference voltage VREF1 and outputs the reference voltage VREF1 as the MUX output signal VMO. Also, when the control signal Ctr1 is "001", the multiplexer 420 selects the reference voltage VREF2 and outputs the reference voltage VREF2 as the MUX output signal VMO. Also, when the control signal Ctr1 is "010", the multiplexer 420 selects the reference voltage VREF3 and outputs the reference voltage VREF3 as the MUX output signal VMO. When the control signal Ctr1 is "011", the multiplexer 420 selects the reference voltage VREF4 and outputs the reference voltage VREF4 as the MUX output signal VMO.

That is, the multiplexer 420 outputs any one of the plurality of signals selected by the control signal Ctr1 in a time division manner. With this, it is possible to set and change a period, at which the angular velocity signal VAO1, the temperature signal VTO, and the reference voltages VREF1, VREF2, VREF3, and VREF4 included in the MUX output signal VMO are output, by the control signal Ctr1. Change of period at which the angular velocity signal VAO1 included in the MUX output signal VMO, the temperature signal VTO, and the reference voltages VREF1, VREF2, VREF3, and VREF4 are output becomes possible, so that optimum setting can be made according to use and environment in which the physical quantity measurement device 1 is used. Accordingly, it is possible to realize the general-purpose physical quantity measurement device 1.

The control signal Ctr2 is input to the failure determination circuit 460 in synchronization with the clock signal CLK and the control signal Ctr1. That is, the failure determination circuit 460 becomes possible to grasp, based on the control signal Ctr2, which signal among the angular velocity signal VAO1, the temperature signal VTO, and the reference voltages VREF1, VREF2, VREF3, and VREF4 the input signal, which is a digital signal, is based on.

The control signal Ctr3 is input to the digital correction circuit 480 in synchronization with the clock signal CLK and the control signal Ctr1. That is, the digital correction circuit 480 becomes possible to grasp, based on the control signal Ctr3, which signal among the angular velocity signal VAO1, the temperature signal VTO, and the reference voltages VREF1, VREF2, VREF3, and VREF4 the input signal, which is a digital signal, is based on.

In the embodiment of the physical quantity measurement device 1, the control signal Ctr2 and the control signal Ctr3 are composed of the same 3-bit data as the control signal Ctr1, but the invention is not limited to this.

The A/D conversion circuit 410 (example of "A/D conversion circuit") A/D converts the MUX output signal VMO output from the multiplexer 420 in synchronization with the clock signal CLK and outputs a MUX output digital signal VDMO. Accordingly, the MUX output digital signal VDMO output from the A/D conversion circuit 410 is a digital signal in which angular velocity digital signal VD1 (example of "third digital signal") obtained by converting the angular velocity signal VAO1 into a digital signal, a temperature digital signal VDTO (example of "first digital signal") obtained by converting the temperature signal VTO into a digital signal, a digital reference voltage VDREF1 obtained by converting the reference voltage VREF1 into a digital signal, a digital reference voltage VDREF2 (example of "second digital signal") obtained by converting the reference voltage VREF2 into a digital signal, a digital reference voltage VDREF3 obtained by converting the reference voltage VREF3 into a digital signal, and a digital reference voltage VDREF4 obtained by converting the reference voltage VREF4 into a digital signal are included in a time division manner.

The digital filter 450 performs filtering processing on the MUX output digital signal VDMO output from the A/D conversion circuit 410 in synchronization with the master clock signal MCLK.

The failure determination circuit 460 (example of "first determination circuit") receives an output signal of the digital filter 450, the control signal Ctr2, and the clock signal CLK. In synchronization with the clock signal CLK, the failure determination circuit 460 determines the failure of the A/D conversion circuit 410 and the temperature sensor 70 based on the temperature digital signal VDTO, the digital reference voltage VDREF1, the digital reference voltage VDREF2, the digital reference voltage VDREF3, the digital reference voltage VDREF4 that are included in the input MUX output digital signal VDMO.

For example, when the input control signal Ctr2 is "111", the failure determination circuit 460 determines that the output signal of the digital filter 450 is a signal based on the temperature digital signal VDTO. Then, the measured value of the temperature digital signal VDTO is stored in a register (not illustrated) or an auxiliary memory 500.

For example, when the input control signal Ctr2 is "000", the failure determination circuit 460 determines that the output signal of the digital filter 450 is a signal based on the digital reference voltage VDREF1. The digital reference voltage VDREF1 is a digital signal based on the reference voltage VREF1 which is a constant potential (Vdd [V] in the first embodiment of the physical quantity measurement device 1). For that reason, the failure determination circuit 460 is able to know an expected value of the digital signal based on the reference voltage VREF1 (Vdd [V] in the first embodiment of the physical quantity measurement device 1).

Accordingly, the failure determination circuit 460 compares the expected value of the digital signal obtained by A/D converting the digital reference voltage VDREF1 with the measured value obtained by A/D converting the digital reference voltage VDREF1 so as to make it possible to determine the failure of the A/D conversion circuit 410. When it is determined that the A/D conversion circuit 410 is in failure in the failure determination of the A/D conversion circuit 410, the failure determination circuit 460 outputs a signal for setting up a failure flag of the A/D conversion circuit 410 in the auxiliary memory 500. A determination threshold value for determining the failure of the A/D conversion circuit 410 may be stored in the auxiliary memory 500 to be described later.

For example, when the input control signal Ctr2 is "011", the failure determination circuit 460 determines that the output signal of the digital filter 450 is a signal based on the digital reference voltage VDREF4. The digital reference voltage VDREF4 is a digital signal based on the reference voltage VREF4 (−Vdd [V] in the first embodiment of the physical quantity measurement device 1) which is a constant potential. For that reason, the failure determination circuit 460 is able to know the expected value of the digital signal based on the reference voltage VREF4.

Accordingly, the failure determination circuit 460 compares the expected value of the digital signal obtained by A/D converting the digital reference voltage VDREF4 with the measured value obtained by A/D converting the digital reference voltage VDREF4 so as to make it possible to determine the failure of the A/D conversion circuit 410. When it is determined that the A/D conversion circuit 410 is in failure in the failure determination of the A/D conversion circuit 410, the failure determination circuit 460 outputs a signal for setting up a failure flag of the A/D conversion circuit 410 in the auxiliary memory 500. A determination threshold value for determining the failure of the A/D conversion circuit 410 may be stored in the auxiliary memory 500 to be described later.

For example, when the input control signal Ctr2 is "001", the failure determination circuit 460 determines that the output signal of the digital filter 450 is a signal based on the digital reference voltage VDREF2. As described above, the output of the reference voltage VREF2 changes with temperature. Accordingly, the output of the digital reference voltage VDREF2 also changes with temperature. For that reason, based on the temperature digital signal VDTO stored in a register (not illustrated) or the auxiliary memory 500, the failure determination circuit 460 calculates an expected value obtained by taking the temperature characteristics of the digital reference voltage VDREF2 into consideration. The failure determination circuit 460 compares the expected value obtained by taking the temperature characteristics of the digital reference voltage VDREF2 into consideration and the measured value of the digital reference voltage VDREF2 so as to make it possible to determine the failure of the A/D conversion circuit 410. Furthermore, when the expected value of the digital reference voltage VDREF2 and the measured value of the digital reference voltage VDREF2 are in the normal range, it is also determined that the temperature digital signal VDTO is normal.

That is, it becomes possible to determine a failure of the temperature sensor 70 by the temperature digital signal VDTO based on the output signal of the temperature sensor 70, the digital reference voltage VDREF2 based on the reference voltage VREF2, the temperature characteristics of the temperature sensor 70, and the temperature characteristics of the reference voltage VREF2. The temperature characteristics of the reference voltage VREF2 and the temperature sensor 70 may be stored in, for example, the auxiliary memory 500.

When it is determined, in the failure determination of the A/D conversion circuit 410 and the temperature sensor 70, that the A/D conversion circuit 410 and the temperature sensor 70 are in failure, the failure determination circuit 460 outputs a signal for setting up a failure flag indicating that the A/D conversion circuit 410 or the temperature sensor 70 are in failure to the auxiliary memory 500.

For example, when the input control signal Ctr2 is "010", the failure determination circuit 460 determines that the output signal of the digital filter 450 is a signal based on the digital reference voltage VDREF3. As described above, the output of the reference voltage VREF3 changes with temperature. Accordingly, the output of the digital reference voltage VDREF3 also changes with temperature. For that reason, based on the temperature digital signal VDTO stored in a register (not illustrated) or the auxiliary memory 500, the failure determination circuit 460 calculates an expected value obtained by taking the temperature characteristics of the digital reference voltage VDREF3 into consideration. The failure determination circuit 460 compares the expected value obtained by taking the temperature characteristics of the digital reference voltage VDREF3 into consideration and the measured value of the digital reference voltage VDREF3 so as to make it possible to determine the failure of the A/D conversion circuit 410. Furthermore, when the expected value of the digital reference voltage VDREF3 and the measured value of the digital reference voltage VDREF3 are in the normal range, it is also determined that the temperature digital signal VDTO is normal.

That is, it becomes possible to determine a failure of the temperature sensor 70 by the temperature digital signal VDTO based on the output signal of the temperature sensor 70, the digital reference voltage VDREF3 based on the reference voltage VREF3, the temperature characteristics of the temperature sensor 70, and the temperature characteristics of the reference voltage VREF3. The temperature characteristics of the reference voltage VREF3 and the temperature sensor 70 may be stored in, for example, the auxiliary memory 500.

When it is determined, in the failure determination of the A/D conversion circuit 410 and the temperature sensor 70, that the A/D conversion circuit 410 and the temperature sensor 70 are in failure, the failure determination circuit 460 outputs a signal for setting up a failure flag indicating that the A/D conversion circuit 410 or the temperature sensor 70 are in failure to the auxiliary memory 500.

From the matters described above, the multiplexer 420 receives the four reference voltages VREF1, VREF2, VREF3, and VREF4 and the temperature signal VTO output from the temperature sensor 70 and outputs the MUX output signal VMO.

Then, the A/D conversion circuit 410 A/D converts the MUX output signal VMO output from the multiplexer 420 and outputs the MUX output digital signal VDMO including the digital reference voltages VDREF1, VDREF2, VDREF3, and VDREF4 and the temperature digital signal VDTO.

The failure determination circuit 460 determines and receives the digital reference voltages VDREF1, VDREF2, VDREF3, and VDREF4 and the temperature digital signal VDTO included in the MUX output digital signal VDMO, based on the control signal Ctr3. Based on the input digital reference voltages VDREF1, VDREF2, VDREF3, and VDREF4 and the temperature digital signal VDTO, and the temperature characteristics of the reference voltages VREF1, VREF2, VREF3, and VREF4 and the temperature sensor 70, the failure determination circuit 460 determines the failure of the temperature sensor 70 and the A/D conversion circuit 410.

That is, in the first embodiment of the physical quantity measurement device 1, a failure determination circuit is configured to include the multiplexer 420, the A/D conversion circuit 410, and the failure determination circuit 460.

In the first embodiment of the physical quantity measurement device 1, regarding failure detection of the temperature sensor 70 and the A/D conversion circuit 410, the failure of the temperature sensor 70 and the A/D conversion circuit 410 is determined based on the four reference voltages VREF1, VREF2, VREF3, VREF4, but, for example, it suffices if there is only one reference voltage (for example, reference voltage VREF2) which changes with temperature.

On the other hand, failure detection of the temperature sensor 70 and the A/D conversion circuit 410 may be performed based on a plurality of reference voltages. The failure detection of the temperature sensor 70 and the A/D conversion circuit 410 based on a plurality of reference voltages is performed so as to make it possible to further improve accuracy of the failure detection of the temperature sensor 70 and the A/D conversion circuit 410.

Furthermore, when a plurality of reference voltages are used, it is preferable that at least one reference voltage does not change with temperature. At least one of the plurality of reference voltages is set as a reference voltage that does not change with temperature so as to make it possible to improve failure detection accuracy of the A/D conversion circuit 410. As the failure detection accuracy of the A/D conversion circuit 410 improves, the failure detection accuracy of the temperature sensor 70 may also be improved.

The digital correction circuit 480 (example of "output correction circuit") receives the output signal of the digital filter 450, the control signal Ctr3, and the master clock signal MCLK. The digital correction circuit 480 corrects the angular velocity digital signal VD1 based on the temperature digital signal VDTO included in the MUX output digital signal VDMO and outputs the corrected signal as the angular velocity data VD01 to the interface circuit 42.

In detail, for example, when the input control signal Ctr2 is "111", the digital correction circuit 480 determines that the output signal of the digital filter 450 is a signal based on the temperature digital signal VDTO. Then, the digital correction circuit 480 prepares correction data of the angular velocity digital signal VD1 from the signal based on the temperature digital signal VDTO.

For example, when the input control signal Ctr2 is "100", the digital correction circuit 480 determines that the output signal of the digital filter 450 is a signal based on the angular velocity digital signal VD1. The digital correction circuit 480 corrects the angular velocity digital signal VD1 with correction data based on the temperature digital signal VDTO and generates the angular velocity data VD01. Then, the digital correction circuit 480 outputs the angular velocity data VD01 to the interface circuit 42. Correction performed by the digital correction circuit 480 includes various processing such as offset correction, sensitivity correction, output range adjustment, bit limitation, and the like.

Correction data of the digital correction circuit 480 is rewritten when the temperature digital signal VDTO is input, and is held while the temperature digital signal VDTO is not input.

The failure determination circuit 470 (example of "second determination circuit") compares the power supply voltage VDD1 generated by the first power supply circuit 10 with the power supply voltage VDD2 generated by the second power supply circuit 11. The power supply voltage VDD1 is a voltage to be the basis of the reference voltages VREF1, VREF2, VREF3, and VREF4. For that reason, the failure determination circuit 470 compares the power supply voltage VDD1 with the power supply voltage VDD2 generated by the second power supply circuit 11, which is different from the first power supply circuit 10 generating the power supply voltage VDD1 so as to determine whether the voltage input to the first power supply circuit 10 is normal or abnormal. With this, reliability of the reference voltages VREF1, VREF2, VREF3, and VREF4 is improved.

For example, the failure determination circuit 470 may be configured with a comparison unit such as a comparator, and for example, the power supply voltage VDD1 and the power supply voltage VDD2 may be converted into digital signals and compared.

When the failure determination circuit 470 determines that the voltage input to the first power supply circuit 10 is not normal, the failure determination circuit 470 outputs a signal for setting up a flag for abnormality of the power supply voltage VDD1 to the auxiliary memory 500.

The auxiliary memory 500 (an example of "memory") receives and holds (stores) a determination threshold used for the failure determination of the A/D conversion circuit 410, a failure determination threshold of the temperature sensor 70, and the temperature characteristics data based on the temperature sensor 70 and the reference voltages VREF2 and VREF3 from the main memory 80. The auxiliary memory 500 outputs data stored to the failure determination circuit 460.

In the first embodiment of the physical quantity measurement device 1, the interface circuit 42 performs processing of reading data stored in the main memory 80 (nonvolatile memory or register) and outputting the data to the MCU 3 or processing of writing data input from the MCU 3 into the main memory 80 (nonvolatile memory or register), in response to a request from the MCU 3. That is, the data stored in the main memory 80 is changed through the interface circuit 42. The auxiliary memory 500 receives and holds (stores) the determination threshold used for the failure determination of the A/D conversion circuit 410, the failure determination threshold of the temperature sensor 70, and the temperature characteristics data based on the temperature sensor 70 and the reference voltages VREF2 and VREF3 from the main memory 80.

From the matters described above, in the first embodiment of the physical quantity measurement device 1, it is possible to change data held (stored) in the auxiliary memory 500 through the interface circuit 42. With this, the failure determination circuit 460 in the first embodiment of the physical quantity measurement device 1 is possible to deal with the temperature sensor and the reference voltage having various temperature characteristics. Accordingly, it is possible to realize a failure determination circuit with high generality.

The auxiliary memory 500 receives the signal for setting up the failure flag output from the failure determination circuit 460 and the failure determination circuit 470 and stores the failure flag. For example, in a 4-bit area, a first bit may be a flag indicating a failure of the temperature sensor 70, a second bit may be a flag in which a failure of the A/D conversion circuit 410 is detected by the reference voltage VREF2 or the reference voltage VREF3, a third bit may be a flag in which the failure of the A/D conversion circuit 410 is detected by the reference voltage VREF1 or the reference voltage VREF4, and a fourth bit may be a flag associated with abnormality of the power supply voltage VDD1.

The failure flag set up in the auxiliary memory 500 is output as failure determination information VFI through the interface circuit 42, for example, in response to a request from the MCU 3.

The interface circuit 42 performs processing for receiving various commands transmitted from the MCU 3 and transmitting data in accordance with the command to the MCU 3.

Failure Determination Method

Here, a failure determination method of the temperature sensor 70 in the first embodiment of the physical quantity measurement device 1 will be described with reference to FIGS. 9 and 10. The failure of the temperature sensor 70 in the first embodiment of the physical quantity measurement device 1 is determined using change in characteristics of the temperature sensor 70 due to temperature and change in characteristics of at least one of the reference voltage VREF2 and the reference voltage VREF3, of which characteristics are changed with temperature, due to temperature. For that reason, in description of FIG. 9 and FIG. 10, description will be made in such a way that the reference voltages VREF2 and VREF3 having temperature characteristics are simply referred to as the reference voltage VREF without particular distinction. Description will be made on the assumption that a signal obtained by converting the reference voltage VREF into a digital signal by the A/D conversion circuit 410 is regarded as the digital reference voltage VDREF.

First, a method of acquiring the reference voltage VREF and temperature characteristics data of the temperature sensor 70 in the first embodiment of the physical quantity measurement device 1 will be described.

Figure 9:
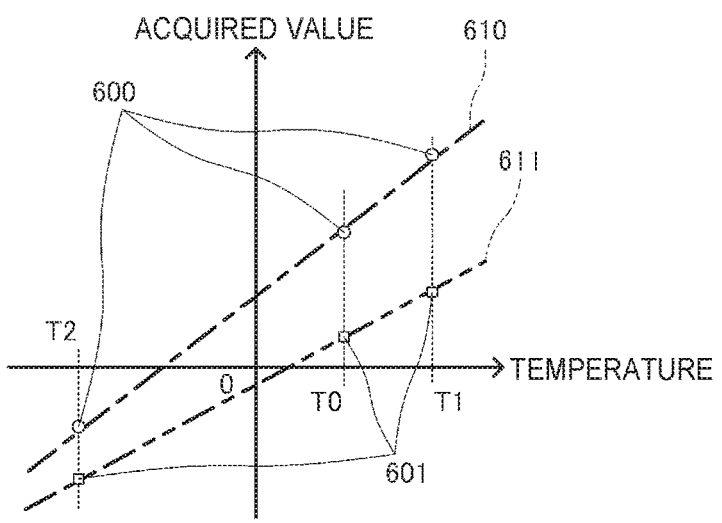
FIG. 9 is a graph for explaining a failure determination method of a failure determination circuit in the first embodiment of the physical quantity measurement device.

FIG. 9 is a graph illustrating a relationship between temperature, the reference voltage VREF, and the output signal of the temperature sensor 70. In FIG. 9, the horizontal axis represents temperature and the vertical axis represents the output value based on the reference voltage VREF and the temperature sensor 70.

Temperature characteristics data is acquired at the manufacturing process or the like of the physical quantity measurement device 1 and calculated based on, for example, an output value based on the reference voltage VREF and example, an output value based on the temperature signal VTO at each of three points of temperatures T0, T1, and T2. Here, the output value based on the reference voltage VREF is a signal based on the digital reference voltage VDREF obtained by converting the reference voltage VREF into a digital signal by the A/D conversion circuit 410 and is a signal input to the failure determination circuit 460. The output value based on the temperature signal VTO is a signal based on the temperature digital signal VDTO obtained by converting the temperature signal VTO into a digital signal by the A/D conversion circuit 410 and is a signal input to the failure determination circuit 460.

In FIG. 9, matters that an example of an acquired value based on the digital reference voltage VDREF is set as a signal 600 and an example of an acquired value based on the temperature digital signal VDTO is set as a signal 601, acquired by the failure determination circuit 460 at three points of temperatures T0, T1 and T2, are illustrated.

Next, a linear approximation is performed based on three signals 600 acquired at three points of the temperatures T0, T1 and T2. Expression 1 is an example of an approximate expression obtained by a first-order linear approximation of three signals 600 and in FIG. 9, an example of an approximate straight line obtained based on Expression 1 is illustrated as an approximate line 610. In Expression 1, (data) SVDref is an acquired value acquired from a signal based on the digital reference voltage VDREF by the failure determination circuit 460 when temperature is the temperature T. Also, a1 and b1 represent constants calculated by the first-order linear approximation.

$$\text{SVDref} = a1 \times T + b1 \quad \text{Expression 1}$$

Similarly, a linear approximation is performed based on three signals 601 acquired at three points of the temperatures T0, T1 and T2. Expression 2 is an example of an approximate expression obtained by a first-order linear approximation of three signals 601 and in FIG. 9, an example of an approximate straight line obtained based on Expression 2 is illustrated as an approximate line 611. In Expression 2, (data) SVDTO is an acquired value acquired from a signal based on the temperature digital signal VDTO by the failure determination circuit 460 when temperature is the temperature T. Also, a2 and b2 represent constants calculated by the first-order linear approximation.

$$\text{SVDTO} = a2 \times T + b2 \quad \text{Expression 2}$$

Then, based on the above Expression 1 and Expression 2, (data) SVDref is calculated from Expression 3 by transforming (data) SVDTO so that (data) SVDTO becomes a variable. Here, $\alpha$ and $\beta$ in Expression 3 represent constants calculated based on the constants a1, a2, b1, and b2.

$$\text{SVDref} = \alpha \times \text{SVDTO} + \beta \quad \text{Expression 3}$$

Figure 10:
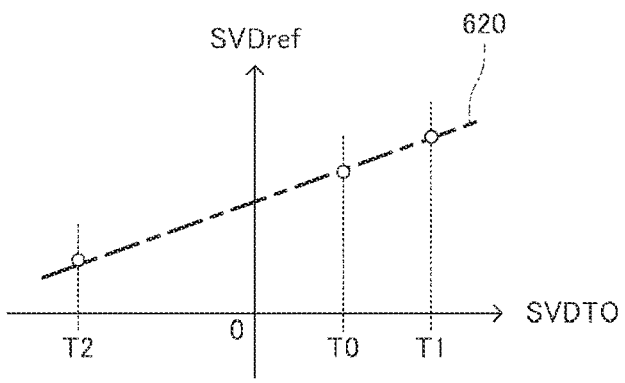
FIG. 10 is a graph for explaining the failure determination method of the failure determination circuit in the first embodiment of a physical quantity measurement device.

FIG. 10 is a graph illustrating a relationship when the horizontal axis is data SVDTO and the vertical axis represents data SVDref. In FIG. 10, a straight line obtained based on Expression 3 is illustrated as an approximate line 620. That is, Expression 3 and the approximate line 620 indicate the temperature characteristics of the reference voltage VREF and the temperature sensor 70.

As described above, the temperature characteristics of the reference voltage VREF and the temperature sensor 70 in the first embodiment of the physical quantity measurement device 1 are obtained by Expression 3. In this case, the data SVDTO is a signal to be determined (acquired) by the failure determination circuit 460 and thus, in the first embodiment of the physical quantity measurement device 1, the constant $\alpha$ and the constant $\beta$ in Expression 3 can be stored as temperature characteristic data. Then, the failure determination circuit 460 reads the constant $\alpha$ and the constant $\beta$ as the temperature characteristics data so as to make it possible to grasp the temperature characteristics of the reference voltage VREF and the temperature sensor 70 and perform a failure determination of the temperature sensor 70.

The stored constant $\alpha$ and constant $\beta$ may be stored as the temperature characteristics data in the auxiliary memory 500 and those stored in the main memory 80 may be transmitted to the auxiliary memory 500 and held (stored) by the auxiliary memory 500. Furthermore, the constant $\alpha$ and the constant $\beta$ may be modified from, for example, the MCU 3 or the like through the interface circuit 42. With this, it is possible to cancel component variation of the temperature sensor 70 and the reference voltage VREF and failure detection accuracy of the temperature sensor 70 is improved.

In the first embodiment of the physical quantity measurement device 1, an approximate expression is calculated using the signal (data SVDref) based on the digital reference voltage VDREF and the signal (data SVDTO) based on the temperature digital signal VDTO which are acquired at the three points of temperatures T0, T1, and T2, but an approximate expression based on three or more points of temperatures may be calculated, for example.

Next, a failure determination method of the temperature sensor 70 in the first embodiment of the physical quantity measurement device 1 will be described. The failure determination of the temperature sensor 70 in the first embodiment of the physical quantity measurement device 1 is determined based on a difference between the data SVDref measured at an arbitrary temperature T and a result obtained by substituting the data SVDTO measured at the same arbitrary temperature T into Expression 3. When the temperature sensor 70 is normal, the data SVDref at an arbitrary temperature T and Expression 3 which is the approximate equation thereof become to have the equivalent value. That is, the failure determination signal G(T, TS) is output close to 0 when the temperature sensor 70 is normal.

That is, as illustrated in Expression 4, when the failure determination signal G(T, TS) is smaller than a first threshold voltage Vth1 which is larger than 0 and larger than a second threshold voltage Vth2 which is smaller than 0, it can be determined that the temperature sensor 70 is normal.

$$Vth1 \le G(T,TS) = \text{SVDref} - (\alpha \times \text{SVDTO} + \beta) \le Vth2 \quad \text{Expression 4}$$

From the matters described above, according to the first embodiment of the physical quantity measurement device 1, the presence or absence of the failure of the temperature sensor 70 is determined based on a difference between an expected value (approximate value) of the signal based on the digital reference voltage VDREF at a predetermined temperature and a measured value of the signal (data SVDref) based on the digital reference voltage VDREF, that are calculated by temperature characteristics data. In this case, the predetermined temperature is determined by a signal (data SVDTO) based on the temperature digital signal VDTO. That is, the failure determination circuit 460 determines the failure determination of the temperature sensor 70 based on the temperature digital signal VDTO obtained by A/D converting the temperature signal VTO output from the temperature sensor 70 by the A/D conversion circuit 410, the digital reference voltage VDREF obtained by converting the reference voltage VREF into a digital signal by the A/D conversion circuit 410 and temperature characteristics data (constant α and constant β) based on the change in characteristics of the temperature sensor 70 due to temperature and the change in characteristics of the reference voltage VREF due to temperature.

In the first embodiment of the physical quantity measurement device 1, in calculation of the approximate expression in Expression 3 and in failure determination in Expression 4, although the failure is determined by using the signal (data SVDTO) based on the temperature digital signal VDTO is used as a variable, for example, a method in which current temperature is estimated from the signal based on the temperature digital signal VDTO and the temperature characteristics of the temperature sensor 70 and a candidate expected value (approximation expression) based on a first criterion is calculated based on the estimated temperature may be adopted.

In the first embodiment of the physical quantity measurement device 1, as illustrated in FIG. 7, a plurality of the signals including the (four) reference voltages VREF1, VREF2, VREF3, and VREF4 and the temperature signal VTO are input to the A/D conversion circuit 410 through the multiplexer 420.

Figure 11:
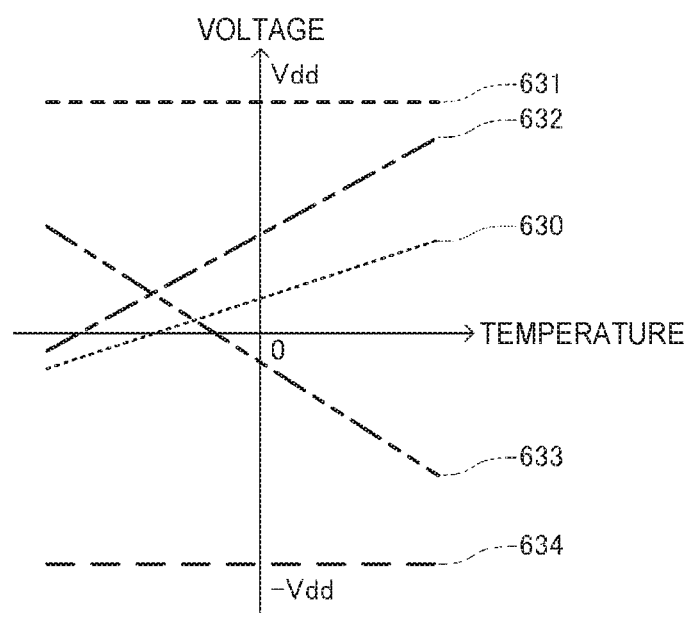
FIG. 11 is a graph illustrating an example of a reference voltage in the first embodiment of the physical quantity measurement device.

In FIG. 11, an example of the temperature characteristics of the four reference voltages VREF1, VREF2, VREF3, VREF4 and the temperature signal VTO in the first embodiment of the physical quantity measurement device 1 illustrated.

In the first embodiment of the physical quantity measurement device 1, in a characteristic line 631 illustrating change in voltage of the reference voltage VREF1 due to temperature, a substantially constant voltage at Vdd [V] is output regardless of the change in temperature. In a characteristic line 632 illustrating change in voltage of the reference voltage VREF2 due to temperature, a voltage level to be output increases with respect rise in temperature. In a characteristic line 633 illustrating change in voltage of the reference voltage VREF3 due to temperature, the voltage level to be output is lowered with respect to rise in temperature. In a characteristic line 634 illustrating change in voltage of the reference voltage VREF4 due to temperature, a substantially constant voltage at −Vdd [V] is output regardless of the temperature change. Then, in the characteristic line 630 illustrating the change in voltage of the temperature signal VTO due to temperature, increases the voltage level to be output increases with respect to rise in temperature.

As described above, the failure determination 460 determines the failure of the A/D conversion circuit 410 based on at least one of the signal based on the digital reference voltage VDREF1 which is the digital signal of the reference voltage VREF1 and the signal based on the digital reference voltage VDREF4 which is the digital signal of the reference voltage VREF4. In the first embodiment of the physical quantity measurement device 1, a substantially constant voltage with respect to the temperature change is output as the reference voltage VREF1 as indicated by the characteristic line 631 and a substantially constant voltage with respect to the temperature change is output as the reference voltage VREF4 as indicated by the characteristic line 634. Accordingly, the digital reference voltage VDREF1 and the digital reference voltage VDREF4 become constant values not influenced by temperature. With this, it is possible for the failure determination circuit 460 to determine failure of the A/D conversion circuit 410 regardless of temperature, it is possible to improve accuracy of failure determination.

On the other hand, the failure determination circuit 460 determines the failure of the temperature sensor 70 based on the temperature characteristics data of at least one of a signal based on the digital reference voltage VDREF2, which is a digital signal of the reference voltage VREF2, and a signal based on the digital reference voltage VDREF3, which is a digital signal of the reference voltage VREF3, the temperature digital signal VDTO which is a digital signal of the temperature signal VTO, at least one of the reference voltage VREF2 and the reference voltage VREF3, and the temperature signal VTO.

In this case, it is preferable that the characteristic line 632 illustrating the change in voltage of the reference voltage VREF2 due to temperature and the characteristic line 633 illustrating the change in voltage of the reference voltage VREF3 due to temperature are different from each other. Further, it is more preferable that the characteristic line 632 illustrating the change in voltage of the reference voltage VREF2 due to temperature and the characteristic line 633 illustrating the change in voltage of the reference voltage VREF3 due to temperature have characteristics that positive or negative are opposite with respect to the temperature.

As such, the characteristics of the characteristic straight line 632 and the characteristic straight line 633 are made different from each other so as to make it possible to perform the failure determination of the temperature sensor based on different temperature characteristics data. Accordingly, it is possible to improve accuracy of failure determination of the temperature sensor 70. Furthermore, it is possible to further improve accuracy of failure determination by performing the failure determination of the temperature sensor 70 using a plurality of reference voltages different from the temperature characteristics of the temperature sensor 70.

Further, according to the first embodiment of the physical quantity measurement device 1, the temperature characteristics data used for the failure determination may store the constants α and β in Expression 3 or 4. That is, as in the first embodiment of the physical quantity measurement device 1, when the failure of the temperature sensor 70 is determined based on the two reference voltages VREF2 and VREF3, the temperature characteristics data stored in the auxiliary memory 500 may be only α1 and β1 indicating the characteristics of the reference voltage VREF 2 and the temperature sensor 70 and α2 and β2 indicating the characteristics of the reference voltage VREF 3 and the temperature sensor 70. Accordingly, it is possible to reduce a usage amount of a storing area of the auxiliary memory 500.

Effects

As described above, in the first embodiment of the physical quantity measurement device 1, the failure determination circuit is configured to include the multiplexer 420, the A/D conversion circuit 410, and the failure determination circuit 460. The multiplexer 420 receives a plurality of signals including the temperature signal VTO output from temperature sensor 70 and the reference voltage VREF2 having temperature characteristics and outputs the signals in a time division manner. The A/D conversion circuit 410 converts a signal including the temperature signal VTO output from the multiplexer 420 by the temperature sensor 70 and the reference voltage VREF2 having the temperature characteristics into a digital signal and outputs the MUX output digital signal VDMO. Then, the failure determination circuit 460 determines the failure of the temperature sensor 70 based on the signal based on the temperature signal VDTO obtained by converting the temperature signal VTO output from the temperature sensor 70, the signal based on the digital reference voltage VDREF2 obtained by converting the reference voltage VREF2, and the temperature characteristics data calculated from the temperature signal VTO output from the temperature sensor 70 and the reference voltage VREF2.

That is, it is possible to determine failure of the temperature sensor 70 based on the change in characteristics of the reference voltage VREF2 having the temperature characteristics due to temperature and the change in characteristics of the temperature signal VTO output from the temperature sensor 70 due to temperature. For that reason, it is unnecessary to provide a plurality of the temperature sensors 70 and it is possible to reduce the increase in the circuit scale of the failure determination circuit. Accordingly, it is possible to realize the failure determination circuit capable of reducing the increase in the circuit scale of the failure determination circuit and determining failure of the temperature sensor 70.

In the first embodiment of the physical quantity measurement device 1, in the failure determination circuit, it is possible to determine the failure of the temperature sensor 70 by both of the change in characteristics of the reference voltage VREF2 and the temperature sensor 70 due to temperature and the change in characteristics the reference voltage VREF3 and the temperature sensor 70 due to temperature. That is, the failure of the temperature sensor 70 can be determined based on a reference voltage having a change due to a plurality of temperatures. Accordingly, it is possible to improve accuracy of failure determination of the temperature sensor 70.

In the first embodiment of the physical quantity measurement device 1, in the failure determination circuit, temperature characteristics data used for the failure determination by the failure determination circuit 460 is stored in the rewritable auxiliary memory 500. The temperature characteristics data can be rewritten and thus, the failure determination circuit can deal with the temperature sensors 70 having different characteristics in a versatile manner. Furthermore, Furthermore, in the first embodiment of the physical quantity measurement device 1, in the failure determination circuit, the temperature characteristics data based on the change in characteristics of the temperature sensor 70 due to temperature and the change in characteristics of the reference voltage VREF2 due to temperature may be stored in the memory in, for example, a manufacturing line, so as to make it possible to cancel variation in the failure determination circuit and to increase determination accuracy of the failure determination circuit. Accordingly, it is possible to realize the failure determination circuit which can reduce the increase in the circuit scale of the failure determination circuit and determine the failure of the temperature sensor 70 with high accuracy.

1.2 Second Embodiment

Figure 12:
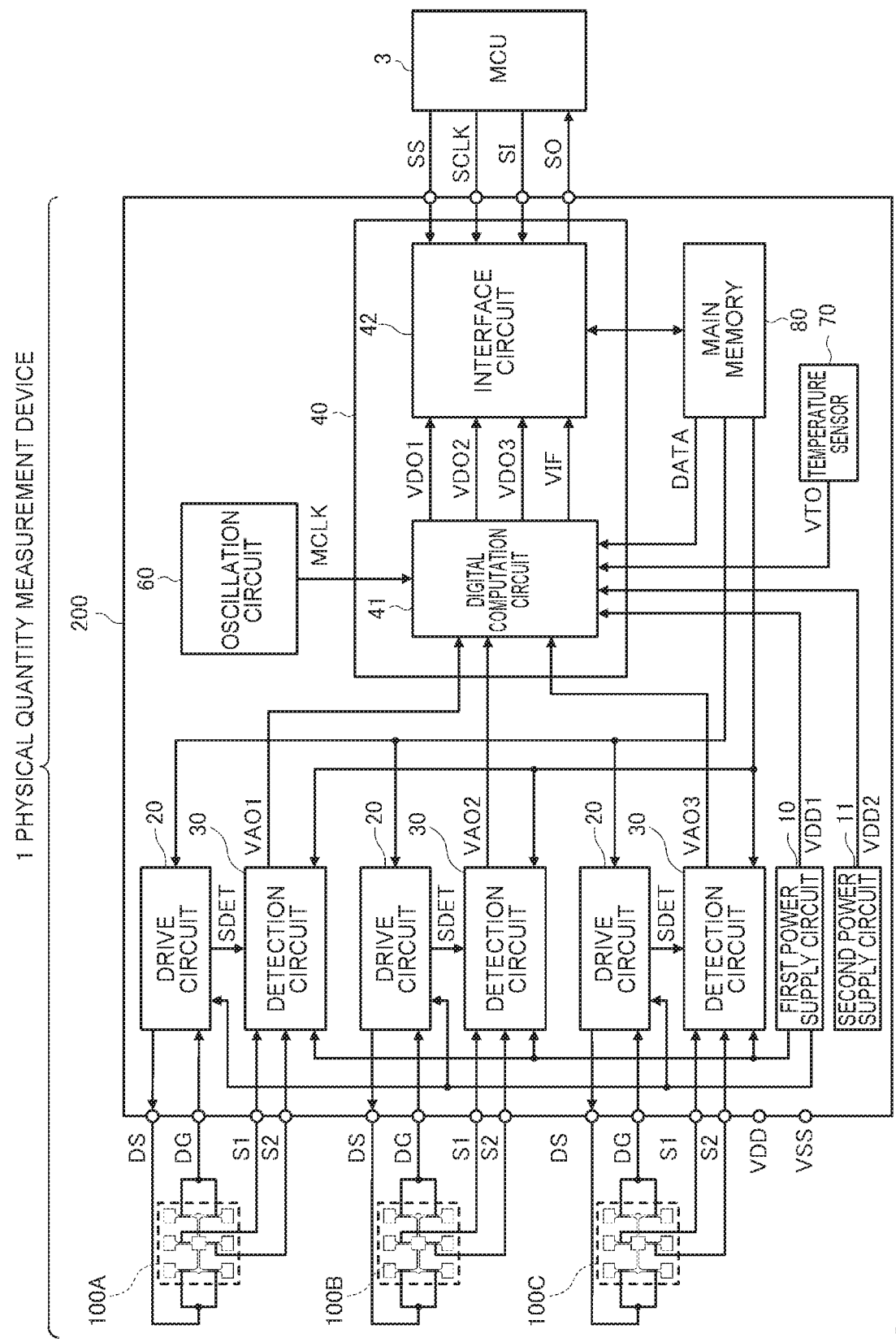
FIG. 12 is a diagram illustrating a configuration example in a second embodiment of the physical quantity measurement device.
Figure 13:
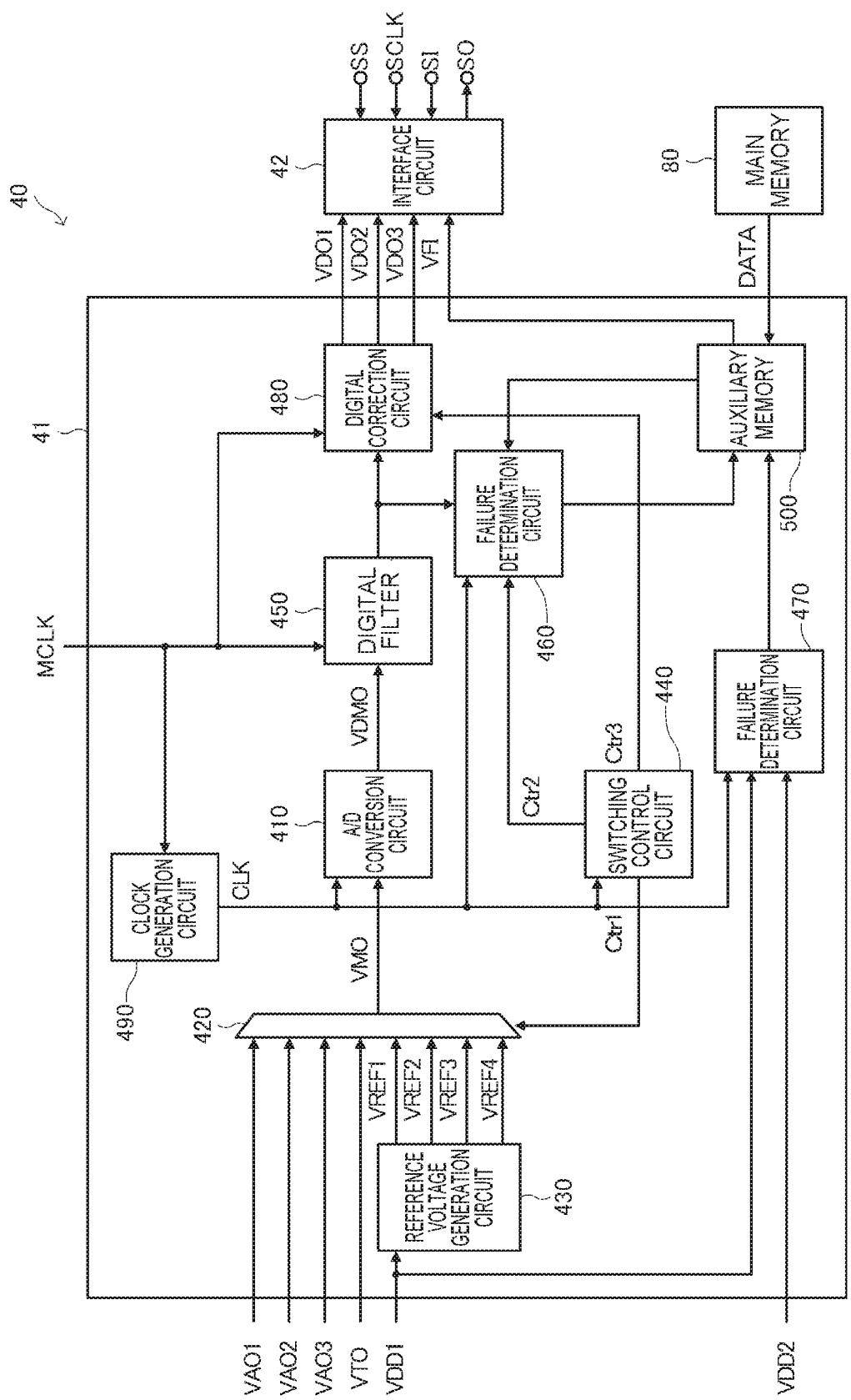
FIG. 13 is a diagram illustrating a configuration of a physical quantity processing circuit in the second embodiment of the physical quantity measurement device.

FIG. 12 is a diagram illustrating a configuration in a second embodiment of the physical quantity measurement device 1. FIG. 13 is a diagram illustrating the configuration of the physical quantity processing circuit 40 in the second embodiment of the physical quantity measurement device 1. A signal measured by one physical quantity measurement element 100 is input to one A/D conversion circuit 410 which continuously A/D converts to acquire a physical quantity in the physical quantity measurement device 1 of the first embodiment, while signals measured by a plurality of (three physical quantity measurement elements in the second embodiment of the physical quantity measurement device 1) physical quantity measurement elements 100A, 100B, 100C are input into the A/D conversion circuits 410 in a time division manner to acquire the physical quantity in the second embodiment of the physical quantity measurement device 1. With this, a triaxial angular velocity sensor can be realized.

In the second embodiment of the physical quantity measurement device 1, the same reference numerals are given to the same constitutional elements as those in the first embodiment of the physical quantity measurement device 1 description redundant with the first embodiment of the physical quantity measurement device 1 will be omitted and description will be made on contents different from those of the first embodiment of the physical quantity measurement device 1.

FIG. 12 is a diagram illustrating the configuration in second embodiment of the physical quantity measurement device 1. The second embodiment of the physical quantity measurement device 1 is configured to include three physical quantity measurement elements 100A, 100B, and 100C and the physical quantity measurement circuit 200. Furthermore, the physical quantity measurement device 1 may be configured to include the MCU 3 that performs various computation processing and control using output data of the physical quantity measurement device 1.

Each of the three physical quantity measurement elements 100A, 100B, 100C has a so-called double T-shaped vibrator element having two T shapes drive vibration arms, similar to the physical quantity measurement element 100 in the first embodiment of the physical quantity measurement device 1 and its detailed explanation will be omitted (see FIGS. 2 to 4).

Similar to the first embodiment of the physical quantity measurement device 1, the physical quantity measurement circuit 200 in the second embodiment of the physical quantity measurement device 1 is configured to include the first power supply circuit 10, the second power supply circuit 11, the drive circuit 20, the detection circuit 30, the physical quantity processing circuit 40, the oscillation circuit 60, the temperature sensor 70, and the main memory 80. The physical quantity measurement circuit 200 in the second embodiment of the physical quantity measurement device 1 is provided with the drive circuits 20 and the detection circuits 30 corresponding to the three physical quantity measurement elements 100A, 100B, and 100C, respectively. The detailed configuration of each of the respective drive circuits 20 and detection circuits 30 are the same as that of the first embodiment of the physical quantity measurement device 1, and description thereof will be omitted (see FIGS. 5 and 6).

The detection circuit 30 connected to a detection electrode of a physical quantity measurement element 100A outputs the angular velocity signal VAO1. Further, the detection circuit 30 connected to a detection electrode of a physical quantity measurement element 100B outputs the angular velocity signal VAO2. The detection circuit 30 connected to a detection electrode of a physical quantity measurement element 100C outputs the angular velocity signal VAO3.

The first power supply circuit 10, the second power supply circuit 11, the oscillation circuit 60, the temperature sensor 70, and the main memory 80 in the second embodiment of the physical quantity measurement device 1 are the same as those in the first embodiment of the physical quantity measurement device 1, and the description thereof will be omitted.

FIG. 13 is a diagram illustrating the configuration of the physical quantity processing circuit 40 in the second embodiment of the physical quantity measurement device 1. Similar to the first embodiment of the physical quantity measurement device 1, the physical quantity processing circuit includes the digital computation circuit 41 and the interface circuit 42.

The digital computation circuit 41 includes the A/D conversion circuit 410, the multiplexer 420, the reference voltage generation circuit 430, the switching control circuit 440, the digital filter 450, the failure determination circuit 460, the failure determination circuit 470, the digital correction circuit 480, the clock generation circuit 490, and the auxiliary memory 500. The digital computation circuit 41 may have a configuration in which some of the components are omitted or changed, or other components are added.

The reference voltage generation circuit 430 generates four reference voltages VREF1, VREF2, VREF3, and VREF4 based on the power supply voltage VDD1 input from the first power supply circuit 10. Details of the reference voltage generation circuit 430 are similar to those of the first embodiment of the physical quantity measurement device 1 (see FIG. 8), and description thereof will be omitted.

The multiplexer 420 receives the angular velocity signals VAO1, VAO2, and VAO3 input from the detection circuit 30, the temperature signal VTO input from the temperature sensor 70, the reference voltages VREF1, VREF2, VREF3, and VREF4, and the control signal Ctr1, and outputs the MUX output signal VMO. That is, the multiplexer 420 receives a plurality of signals including the angular velocity signals VAO1, VAO2, and VAO3, the reference voltages VREF1, VREF2, VREF3, and VREF4, and the temperature signal VTO measured by the temperature sensor 70, and outputs the plurality of signals as the MUX output signal VMO in a time division manner, according to the control signal Ctr1. In other words, the MUX output signal VMO is one signal including the angular velocity signals VAO1, VAO2, and VAO3, the temperature signal VTO, and the reference voltages VREF1, VREF2, VREF3, and VREF4. The signal input to the multiplexer 420 is not limited to the signals, but may include, for example, various signals such as acceleration, pressure, and humidity.

The clock generation circuit 490 generates and outputs a clock signal CLK used for sampling of the A/D conversion circuit 410 based on the master clock signal MCLK (output signal of the oscillation circuit 60). The clock signal CLK is also input to the failure determination circuits 460 and 470 and the switching control circuit 440 in common.

The switching control circuit 440 outputs control signals Ctr1, Ctr2, and Ctr3 to the multiplexer 420, the failure determination circuit 460, and the digital correction circuit 480.

The control signal Ctr1 selects the signal output from the multiplexer 420. For example, the control signal Ctr1 is a 3-bit signal, and when the control signal Ctr1 is "100", the multiplexer 420 selects the angular velocity signal VAO1 and outputs the angular velocity signal VAO1 as the MUX output signal VMO. When the control signal Ctr1 is "101", the multiplexer 420 selects the angular velocity signal VAO2 and outputs the angular velocity signal VAO2 as the MUX output signal VMO. When the control signal Ctr1 is "110", the multiplexer 420 selects the angular velocity signal VAO1 and outputs the selected angular velocity signal VAO1 as the MUX output signal VMO. When the control signal Ctr1 is "111", the multiplexer 420 selects the temperature signal VTO and outputs the temperature signal VTO as the MUX output signal VMO. When the control signal Ctr1 is "000", the multiplexer 420 selects the reference voltage VREF1 and outputs the reference voltage VREF1 as the MUX output signal VMO. When the control signal Ctr1 is "001", the multiplexer 420 selects the reference voltage VREF2 and outputs the reference voltage VREF2 as the MUX output signal VMO. When the control signal Ctr1 is "010", the multiplexer 420 selects the reference voltage VREF3 and outputs the reference voltage VREF3 as the MUX output signal VMO. When the control signal Ctr1 is "011", the multiplexer 420 selects the reference voltage VREF4 and outputs the reference voltage VREF4 as the MUX output signal VMO.

The control signal Ctr2 is input to the failure determination circuit 460 in synchronization with the clock signal CLK and the control signal Ctr1. That is, the failure determination circuit 460 is possible to grasp, based on the control signal Ctr2, which signal among the angular velocity signals VAO1, VAO2, and VAO3, the temperature signal VTO, and the reference voltages VREF1, VREF2, VREF3, and VREF4 the input signal, which is a digital signal, is based on.

The control signal Ctr3 is input to the digital correction circuit 480 in synchronization with clock signal CLK and control signal Ctr1. That is, the digital correction circuit 480 is possible to grasp, by the control signal Ctr3, which signal among the angular velocity signals VAO1, VAO2, and VAO3, the temperature signal VTO, and the reference voltages VREF1, VREF2, VREF3 and VREF4 the input signal, which is a digital signal, is based on.

In the second embodiment of the physical quantity measurement device 1, the control signal Ctr2 and the control signal Ctr3 are assumed to be configured with the same 3-bit data as the control signal Ctr1, but is not limited thereto.

The A/D conversion circuit 410 A/D converts the MUX output signal VMO output from the multiplexer 420 in synchronism with the clock signal CLK, and outputs the MUX output digital signal VDMO. Accordingly, the MUX output digital signal VDMO to be output by the A/D conversion circuit 410 is a digital signal in which the angular velocity digital signal VD1 obtained by converting the angular velocity signal VAO1 into a digital signal, the angular velocity digital signal VD2 obtained by converting the angular velocity signal VAO2 into a digital signal, the angular velocity digital signal VD3 obtained by converting the angular velocity signal VAO3 into a digital signal, the temperature digital signal VDTO obtained by converting the temperature signal VTO into a digital signal, the digital reference voltage VDREF1 obtained by converting the reference voltage VREF1 into a digital signal, the digital reference voltage VDREF2 obtained by converting the reference voltage VREF2 into a digital signal, the digital reference voltage VDREF3 obtained by converting the reference voltage VREF3 into a digital signal, and the digital reference voltage VDREF4 obtained by converting the reference voltage VREF4 into a digital signal are included in a time division manner.

The digital filter 450 performs filtering processing on the MUX output digital signal VDMO output from the A/D conversion circuit 410 in synchronization with the master clock signal MCLK.

The failure determination circuit 460 receives the output signal of digital filter 450, the control signal Ctr2, and the clock signal CLK. The failure determination circuit 460 determines the failure of the A/D conversion circuit 410 and the temperature sensor 70 based on the temperature digital signal VDTO, the digital reference voltage VDREF1, the digital reference voltage VDREF2, the digital reference voltage VDREF3, and the digital reference voltage VDREF4 that are included in the input MUX output digital signal VDMO in synchronization with the clock signal CLK. Details of the failure determination method are the same as those of the first embodiment of the physical quantity measurement device 1, and description thereof will be omitted.

That is, also in the second embodiment of the physical quantity measurement device 1, a failure determination circuit is configured with the multiplexer 420 that receives a plurality of signals and selects and outputs the signal of the plurality of signals, the A/D conversion circuit 410 that converts the output of the multiplexer 420 into a digital signal, and the failure determination circuit 460 that determines the failure of the A/D conversion circuit 410 and the temperature sensor 70 based the output signal from the A/D conversion circuit 410 and temperature characteristics data and the determination threshold value input from the auxiliary memory 500.

The digital correction circuit 480 receives the output signal of digital filter 450, the control signal Ctr3, and the master clock signal MCLK. The digital correction circuit 480 corrects the angular velocity digital signals VD1, VD2, and VD3 based on the temperature digital signal VDTO included in the MUX output digital signal VDMO and outputs the corrected signal as the angular velocity data VDO1, VDO2 and VDO3 to the interface circuit 42.

In detail, for example, when the input control signal Ctr2 is "111", the digital correction circuit 480 determines that the output signal of the digital filter 450 is a signal based on the temperature digital signal VDTO. Then, the digital correction circuit 480 prepares correction data of the angular velocity digital signal VD1 from the signal based on the temperature digital signal VDTO.

For example, when the input control signal Ctr2 is "100", the digital correction circuit 480 determines that the output signal of the digital filter 450 is a signal based on the angular velocity digital signal VD1. The digital correction circuit 480 corrects the angular velocity digital signal VD1 with correction data based on the temperature digital signal VDTO, and generates the angular velocity data VDO1. Then the digital correction circuit 480 outputs the angular velocity data VDO1 to the interface circuit 42.

For example, when the input control signal Ctr2 is "101", the digital correction circuit 480 determines that the output signal of the digital filter 450 is a signal based on the angular velocity digital signal VD2. The digital correction circuit 480 corrects the angular velocity digital signal VD2 with the correction data based on the temperature digital signal VDTO, and generates the angular velocity data VDO2. Then, the digital correction circuit 480 outputs the angular velocity data VDO2 to the interface circuit 42.

For example, when the input control signal Ctr2 is "110", the digital correction circuit 480 determines that the output signal of the digital filter 450 is a signal based on the angular velocity digital signal VD3. The digital correction circuit 480 corrects the angular velocity digital signal VD3 with correction data based on the temperature digital signal VDTO, and generates angular velocity data VDO3. Then, the digital correction circuit 480 outputs the angular velocity data VDO3 to the interface circuit 42.

Correction performed by the digital correction circuit 480 includes various processing such as offset correction, sensitivity correction, output range adjustment, bit limitation, and the like.

Correction data of the digital correction circuit 480 is rewritten when the temperature digital signal VDTO is input, and is held while the temperature digital signal VDTO is not input.

Similar to the first embodiment of the physical quantity measurement device 1, the failure determination circuit 470 compares the power supply voltage VDD1 generated by the first power supply circuit 10 with the power supply voltage VDD2 generated by the second power supply circuit 11.

Similar to the first embodiment of the physical quantity measurement device 1, the auxiliary memory 500 receives the determination threshold used for the failure determination of the A/D conversion circuit 410, the temperature characteristics data and the failure determination threshold value of the temperature sensor 70, and the temperature characteristics data of reference voltages VREF2 and VREF3 from the main memory 80. Then, the auxiliary memory 500 outputs the received data to the failure determination circuit 460.

The auxiliary memory 500 receives a signal for setting up a failure flag output from the failure determination circuit 460 and the failure determination circuit 470 and stores the failure flag. The failure flag set up in the auxiliary memory 500 is output as failure determination information VFI through the interface circuit 42, for example, in response to a request from the MCU 3.

The interface circuit 42 receives various commands transmitted from the MCU 3 and performs processing of transmitting data in accordance with the command to the MCU 3.

1.3 Modification Example

Although the physical quantity measurement device (angular velocity measurement device) including the physical quantity measurement element for measuring the angular velocity is described as an example in the embodiment described above, the invention may also be applied to the physical quantity measurement device including the physical quantity measurement element device for measuring various physical quantities. The physical quantity measured by the physical quantity measurement element is not limited to the angular velocity, but may include angular acceleration, acceleration, geomagnetism, inclination, or the like. Also, the vibrator element of the physical quantity measurement element need not be a double T-shaped vibrator element and may be, for example, a tuning fork type vibrator element, a comb tooth type vibrator element, a tuning bar type vibrator element having a shape such as a triangular pillar, a quadrangular pillar, a columnar shape. As a material of the vibrator element of the physical quantity measurement element, for example, a piezoelectric material such as a piezoelectric single quartz crystal such as lithium tantalate ($LiTaO_3$) or lithium niobate ($LiNbO_3$) or piezoelectric ceramics such as lead zirconate titanate (PZT) may be used instead of quartz crystal ($SiO_2$), or a silicon semiconductor may be used. Further, for example, a structure in which a piezoelectric thin film such as zinc oxide (ZnO), aluminum nitride (AlN) or the like sandwiched between the drive electrodes is disposed on a portion of the surface of a silicon semiconductor may be available. The physical quantity measurement element is not limited to a piezoelectric type element, but may be a vibration type element such as an electrodynamic type element, an electrostatic capacity type element, an eddy current type element, an optical type element, a strain gauge type element, or the like. Alternatively, a system of the physical quantity measurement element is not limited to a vibration type system, but may be, for example, an optical type system, a rotary type system, or a fluid type system.

2. Electronic Apparatus

Next, an electronic apparatus according to the embodiment will be described with reference to the drawings. The electronic apparatus according to the embodiment includes a physical quantity measurement device 1 according to the invention. Hereinafter, an electronic apparatus including the physical quantity measurer 400 will be described as the physical quantity measurement device 1 according to the invention.

Figure 14:
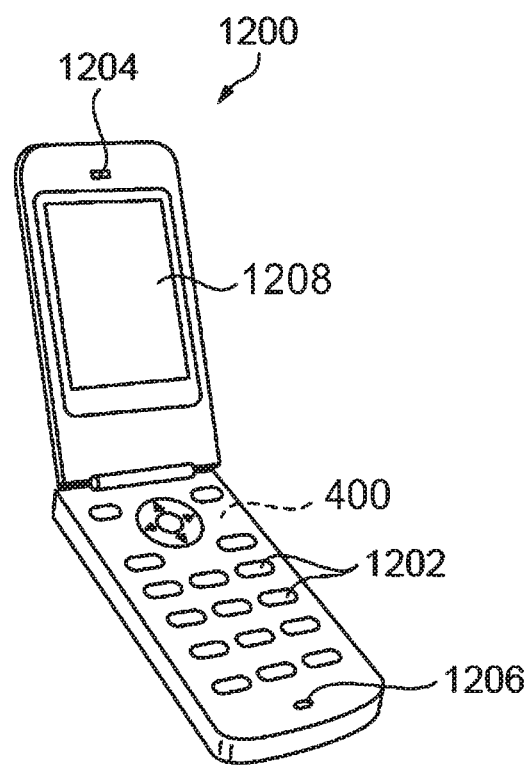
FIG. 14 is a diagram schematically illustrating an example of an electronic apparatus according to an embodiment.

FIG. 14 is a perspective view schematically illustrating a mobile phone (including PHS) 1200 as an electronic apparatus according to the embodiment.

As illustrated in FIG. 14, the mobile phone 1200 has a plurality of operation buttons 1202, an earpiece 1204, and a mouthpiece 1206, and a display unit 1208 is disposed between the operation buttons 1202 and the earpiece 1204.

The physical quantity measurer 400 is built in such a mobile phone 1200.

Figure 15:
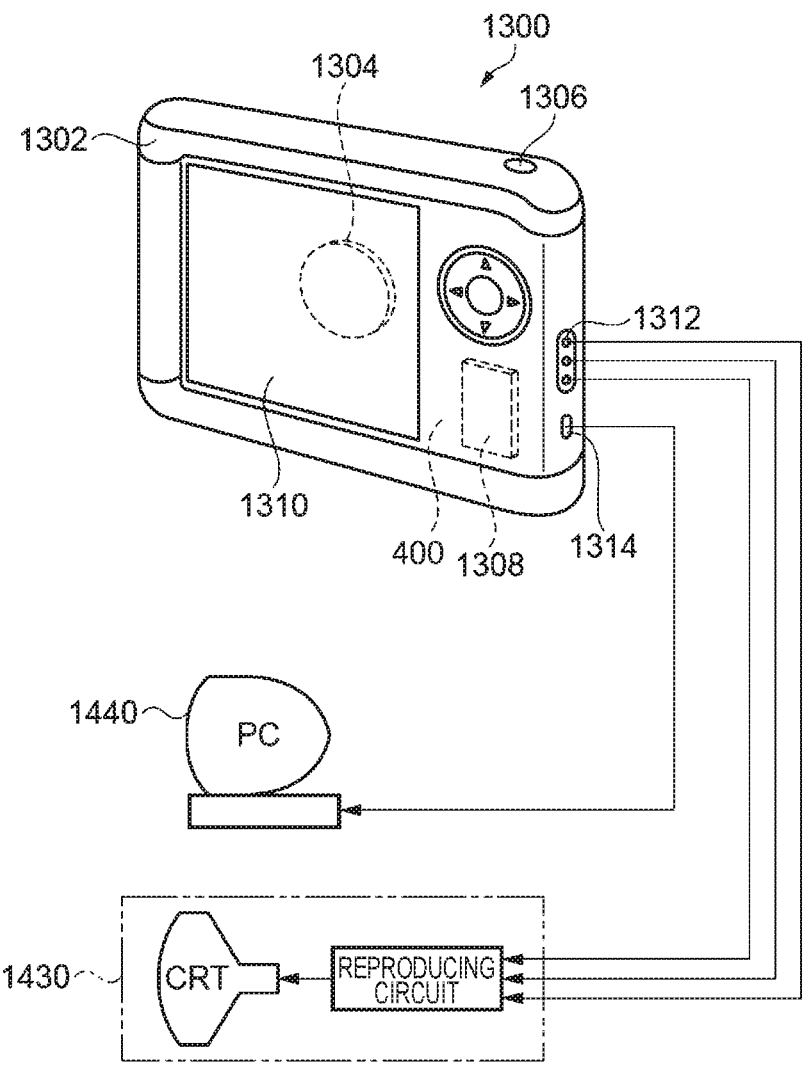
FIG. 15 is a diagram schematically illustrating another example of the electronic apparatus according to an embodiment.

FIG. 15 is a perspective view schematically illustrating a digital still camera 1300 as the electronic apparatus according to the embodiment. FIG. 15 also simply illustrates connection of the digital still camera 1300 with the external device.

Here, an ordinary camera exposes a silver salt photographic film to an optical image of a subject, whereas the digital still camera 1300 performs photoelectric conversion on an optical image of the subject by an image pickup element such as a charge coupled device (CCD) to generate an image pickup signal (image signal).

A display unit 1310 is provided on the back surface of a case (body) 1302 of the digital still camera 1300 and is configured to perform display based on the image pickup signal by the CCD, and the display unit 1310 function as a viewfinder to display the subject as an electronic image.

A light receiving unit 1304 including an optical lens (image pickup optical system) and a CCD or the like is provided on the front surface side (back surface side in the figure) of the case 1302.

When a photographer confirms a subject image displayed on the display unit 1310 and presses a shutter button 1306, the image pickup signal of the CCD at that time is transferred to and stored in the memory 1308.

Also, in the digital still camera 1300, a video signal output terminal 1312 and an input and output terminal 1314 for data communication are provided on the side surface of the case 1302. A TV monitor 1430 and a personal computer 1440 are connected to the video signal output terminal 1312 and the input and output terminal 1314 for data communication, respectively, as necessary. Furthermore, a configuration in which the image pickup signal stored in the memory 1308 is output to the television monitor 1430 or the personal computer 1440 by a predetermined operation is adopted.

The physical quantity measurer 400 is built in the digital still camera 1300.

In addition to the cellular phone illustrated in FIG. 14 and the digital still camera illustrated in FIG. 15, the electronic apparatus including the physical quantity measurer 400 may be applied to a personal computer (mobile personal computer), an ink jet type ejecting device (for example, ink jet printer), a laptop personal computer, a television, a video camera, a video tape recorder, various navigation devices, a pager, an electronic notebook (including electronic notebook with a communication function), an electronic dictionary, a calculator, an electronic game device, a head mounted display, a word processor, a workstation, a video phone, a TV monitor for crime prevention, an electronic binocular, a POS terminal, a medical device (for example, an electronic thermometer, a blood pressure monitor, a blood glucose meter, an electrocardiogram measuring device, an ultrasonic diagnostic device, an electronic endoscope), a fish finder, various measuring instruments, instruments (for example, instruments of an automobile, aircraft, rocket, and a ship), posture control of a robot, a human body or the like, a flight simulator, and the like.

The electronic apparatus according to the embodiment includes the physical quantity measurer 400 capable of measuring the angular velocity and acceleration with stable characteristics while suppressing an increase in the circuit scale. Accordingly, it is possible to realize an electronic apparatus with higher reliability at a lower cost.

3. Vehicle

Next, a vehicle according to the embodiment will be described with reference to the drawings. The vehicle according to the embodiment includes the physical quantity sensor according to the invention. Hereinafter, the vehicle including the physical quantity measurer 400 will be described as the physical quantity sensor according to the invention.

Figure 16:
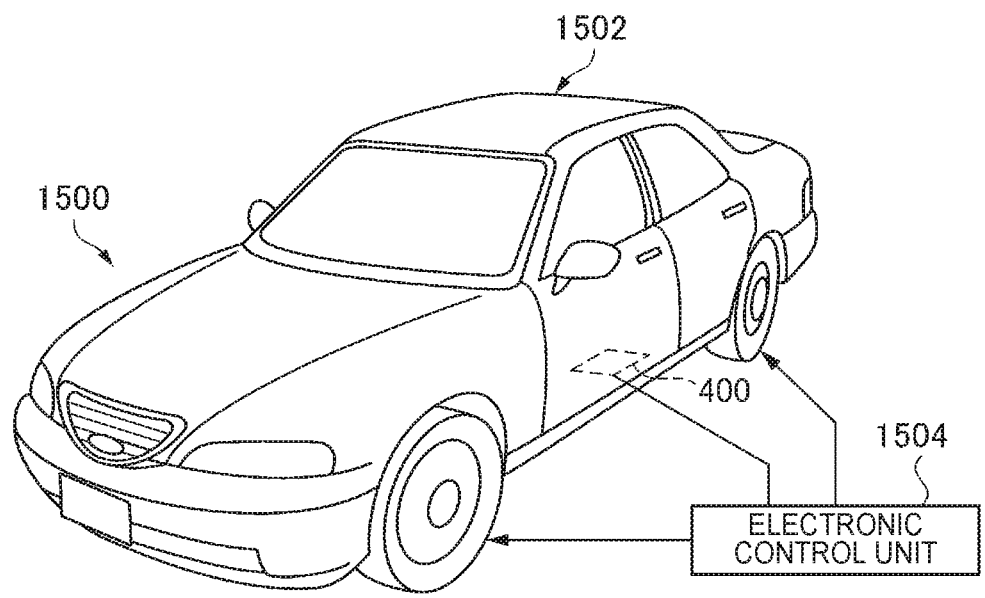
FIG. 16 is a diagram schematically illustrating an example of a vehicle according to an embodiment.

FIG. 16 is a perspective view schematically illustrating an automobile 1500 as the vehicle according to the embodiment.

The physical quantity measurer 400 is built in the automobile 1500. In detail, as illustrated in FIG. 16, an automobile body 1502 of the automobile 1500 is provided with an electronic control unit (ECU) which has built the physical quantity measurement element 100 for measuring the angular velocity of the automobile 1500 and controls the output of the engine 1504 is installed. The physical quantity measurer 400 may be widely applied to an automobile body posture control unit, an anti-lock braking system (ABS), an air bag, a tire pressure monitoring system (TPMS).

The electronic apparatus according to the embodiment includes the physical quantity measurer 400 capable of measuring the angular velocity and acceleration with stable characteristics while suppressing an increase in the circuit scale. Accordingly, it is possible to realize an electronic apparatus with higher reliability at a lower cost.

The invention is not limited to the embodiment and various modifications can be made thereto within a scope of the gist of the invention.

The embodiment and the modification example described above are examples and the invention is not limited thereto. For example, it is also possible to appropriately combine each embodiment and each modification example.

The invention includes substantially the same configuration (for example, configuration having the same function, method, and result, or configuration having the same object and effect) as the configuration described in the embodiment. The invention includes a configuration in which non-essential portions of the configuration described in the embodiment are replaced. The invention includes a configuration that achieves the same effect as the configuration described in the embodiment, or a configuration that can achieve the same object. Further, the invention includes a configuration in which a well-known technique is added to the configuration described in the embodiment.

The entire disclosure of Japanese Patent Application No. 2017-062394, filed Mar. 28, 2017 is expressly incorporated by reference herein.

What is claimed is:

1. A failure determination circuit comprising:
   a switching circuit configured to:
      receive a signal including an output voltage from a temperature sensor and a first reference voltage; and
      output the signal in a time division manner as an output signal;
   an A/D conversion circuit configured to A/D convert the output signal of the switching circuit; and
   a first determination circuit,
   wherein the first determination circuit determines a failure of the temperature sensor based on
   a signal based on a first digital signal obtained by A/D converting the output voltage from the temperature sensor using the A/D conversion circuit,
   a signal based on a second digital signal obtained by A/D converting the first reference voltage using the A/D conversion circuit, and
   temperature characteristics data based on a change in characteristics of the temperature sensor due to temperature and a change in characteristics of the first reference voltage due to temperature.

2. The failure determination circuit according to claim 1, further comprising:
   a second determination circuit;
   wherein the first reference voltage is generated based on a first power supply voltage, and
   the second determination circuit receives the first power supply voltage and a second power supply voltage different from the first power supply voltage and compares the first power supply voltage with the second power supply voltage to determine abnormality of the first power supply voltage.

3. A physical quantity measurement device comprising:
   the failure determination circuit according to claim 2.

4. The failure determination circuit according to claim 1, further comprising:
   a memory;
   wherein the temperature characteristics data is stored in the memory, and
   the temperature characteristics data stored in the memory is changeable.

5. A physical quantity measurement device comprising:
   the failure determination circuit according to claim 4.

6. An electronic apparatus comprising:
   the physical quantity measurement device according to claim 5.

7. The failure determination circuit according to claim 1, wherein the switching circuit further receives a second reference voltage, and
   the change in characteristics of the first reference voltage due to temperature and a change in characteristics of the second reference voltage due to temperature are different from each other.

8. A physical quantity measurement device comprising:
   the failure determination circuit according to claim 7.

9. An electronic apparatus comprising:
   the physical quantity measurement device according to claim 8.

10. A vehicle comprising:
    the physical quantity measurement device according to claim 8.

11. The failure determination circuit according to claim 1, wherein the switching circuit further receives another reference voltage, and
    a change in characteristics of the another reference voltage due to temperature and the change in characteristics of the first reference voltage due to temperature are different from each other.

12. A physical quantity measurement device comprising:
    the failure determination circuit according to claim 11.

13. An electronic apparatus comprising:
    the physical quantity measurement device according to claim 12.

14. A vehicle comprising:
    the physical quantity measurement device according to claim 12.

15. A physical quantity measurement device comprising:
    the failure determination circuit according to claim 1.

16. An electronic apparatus comprising:
    the physical quantity measurement device according to claim 15.

17. A vehicle comprising:
    the physical quantity measurement device according to claim 15.

18. The physical quantity measurement device according to claim 15, further comprising:
    a physical quantity measurement element; and
    an output correction circuit;
    wherein a signal based on a physical quantity measurement signal measured by the physical quantity measurement element is further input to the switching circuit, and
    the output correction circuit corrects a target signal based on a third digital signal obtained by A/D converting the signal, which is based on the physical quantity measurement signal measured by the physical quantity measurement element, using the A/D conversion circuit with a signal based on the first digital signal obtained using A/D converting the output voltage of the temperature sensor using the A/D conversion circuit and outputs the corrected signal.

19. An electronic apparatus comprising:
the physical quantity measurement device according to claim 18.

20. A vehicle comprising:
the physical quantity measurement device according to claim 18.

* * * * *